United States Patent
Xie et al.

(10) Patent No.: US 11,096,077 B2
(45) Date of Patent: Aug. 17, 2021

(54) COMMUNICATION METHOD, DEVICE AND SYSTEM

(71) Applicant: Huawei Technologies Co., Ltd., Shenzhen (CN)

(72) Inventors: Yong Xie, Chengdu (CN); Lei Chen, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/951,643

(22) Filed: Apr. 12, 2018

(65) Prior Publication Data

US 2018/0234872 A1   Aug. 16, 2018

Related U.S. Application Data

(63) Continuation of application No. PCT/CN2016/099454, filed on Sep. 20, 2016.

(30) Foreign Application Priority Data

Oct. 13, 2015   (CN) .......................... 201510670364.5

(51) Int. Cl.
*H04W 24/10* (2009.01)
*H04L 27/26* (2006.01)
(Continued)

(52) U.S. Cl.
CPC ........... *H04W 24/10* (2013.01); *H04L 5/0007* (2013.01); *H04L 5/0044* (2013.01);
(Continued)

(58) Field of Classification Search
CPC . H04W 24/10; H04W 16/14; H04W 72/0453; H04L 27/2602; H04L 5/0091; H04L 5/0044; H04L 5/0007
See application file for complete search history.

(56) References Cited

U.S. PATENT DOCUMENTS

| 2002/0178362 A1 | 11/2002 | Kwon | |
|---|---|---|---|
| 2013/0034050 A1* | 2/2013 | Ros | H04B 7/185 370/316 |

(Continued)

FOREIGN PATENT DOCUMENTS

| CN | 101841866 A | 9/2010 |
|---|---|---|
| CN | 102143534 A | 8/2011 |

(Continued)

OTHER PUBLICATIONS

Arikan, E., "Channel Polarization: A Method for Constructing Capacity-Achieving Codes for Symmetric Binary-Input Memoryless Channels," IEEE Trans. Inf. Theory, vol. 55, Issue 7, Jul. 2009, 23 pages.

(Continued)

*Primary Examiner* — Hassan Kizou
*Assistant Examiner* — Abdullahi Ahmed
(74) *Attorney, Agent, or Firm* — Slater Matsil, LLP

(57) ABSTRACT

The present application discloses a communication method, including: determining, by a network device, a first sub-band and a second sub-band; sending configuration information of the second sub-band to user equipment on the first sub-band, where the configuration information of the second sub-band includes identification information of the second sub-band, the identification information of the second sub-band is used by the user equipment to determine a physical layer basic parameter of the second sub-band, and a physical layer basic parameter of the first sub-band is different from the physical layer basic parameter of the second sub-band; and communicating, by the network device, with the user equipment by using the second sub-band.

16 Claims, 9 Drawing Sheets

(51) Int. Cl.
    *H04L 5/00*     (2006.01)
    *H04W 16/14*     (2009.01)
    *H04W 72/04*     (2009.01)

(52) U.S. Cl.
    CPC ........ *H04L 5/0091* (2013.01); *H04L 27/2602* (2013.01); *H04W 16/14* (2013.01); *H04W 72/0453* (2013.01)

(56) References Cited

U.S. PATENT DOCUMENTS

| | | | |
|---|---|---|---|
| 2013/0210416 A1 | 8/2013 | Duan | |
| 2015/0016410 A1 | 1/2015 | Lee et al. | |
| 2015/0146686 A1* | 5/2015 | Huang | H04W 36/08 370/331 |
| 2015/0256308 A1 | 9/2015 | Ma et al. | |
| 2017/0026685 A1* | 1/2017 | Xiu | H04B 1/0057 |
| 2017/0086171 A1* | 3/2017 | Fliess | H04W 72/1289 |
| 2017/0325164 A1* | 11/2017 | Lee | H04W 76/28 |
| 2018/0220405 A1* | 8/2018 | Feng | H04W 4/50 |
| 2018/0279373 A1* | 9/2018 | Lee | H04W 48/14 |
| 2020/0015284 A1* | 1/2020 | Liu | H04W 74/0833 |

FOREIGN PATENT DOCUMENTS

| | | |
|---|---|---|
| CN | 103220796 A | 7/2013 |
| WO | 2013122384 A1 | 8/2013 |
| WO | 2016155531 A1 | 10/2016 |

OTHER PUBLICATIONS

Blasco-Serrano, R. et al., "Polar Codes for Cooperative Relaying," IEEE Transactions on Communications, vol. 60, No. 11, Nov. 2012, pp. 3263-3273.

Abdoli, J. et al.,"Filtered OFDM: A New Waveform for Future Wireless Systems," 2015 IEEE 16th International Workshop on Signal Processing Advances in Wireless Communications (SPAWC), Aug. 31, 2015, pp. 66-70.

Huawei Technologies, "Vision on 5G Radio Access Technologies," RWS-150006, 3GPP RAN Workshop on 5G, Phoenix, USA, Sep. 17-18, 2015, 18 pages.

Zhang, X. et al.,"Filtered-OFDM—Enabler for Flexible Waveform in The 5th Generation Cellular Networks," Accepted to IEEE Globecom, San Diego, CA, Dec. 2015, pp. 1-6.

* cited by examiner

COMMUNICATION METHOD, DEVICE AND SYSTEM

CROSS-REFERENCE TO RELATED APPLICATIONS

This application is a continuation of International Application No. PCT/CN2016/099454, filed on Sep. 20, 2016, which claims priority to Chinese Patent Application No. 201510670364.5, filed on Oct. 13, 2015. The disclosures of the aforementioned applications are hereby incorporated by reference in their entireties.

TECHNICAL FIELD

The present application relates to the field of communications technologies, and specifically, to a communication method, a device, and a system.

BACKGROUND

In existing cellular communications, one carrier usually includes only one type of waveform and one type of physical layer basic parameter. In bandwidth of all frequencies included in one carrier, one set of physical layer basic parameters are used. The physical layer basic parameter usually includes a transmission time interval (TTI), a subcarrier spacing, a cyclic prefix (CP) length, and the like. On a carrier, if different physical layer basic parameters are used in bandwidth of different frequency bands, resources that use different parameters are prone to mutual interference, and consequently, system performance is reduced. In an existing cellular system, such a mode of a fixed physical layer basic parameter is basically used, and a universally applicable compromised parameter is selected. However, such a fixed mode is inapplicable to a wireless communications requirement for future service environment diversity and communication environment diversity.

SUMMARY

To resolve a problem in a current system that a multi-service requirement cannot be better met due to a fixed physical layer basic parameter of a carrier, embodiments of the present application provide a communication method. A network device may send configuration information of sub-bands with different physical layer basic parameters to user equipment, and the network device and the user equipment may communicate with each other by using different sub-bands, so that a requirement for communication service diversity is met. The embodiments of the present application further provide a corresponding device and system.

A first aspect of the present application provides a communication method. The method includes determining, by a network device, a first sub-band and a second sub-ban. The method also includes sending, by the network device, configuration information of the second sub-band to user equipment on the first sub-band, where the configuration information of the second sub-band includes identification information of the second sub-band, the identification information of the second sub-band is used by the user equipment to determine a physical layer basic parameter of the second sub-band, and a physical layer basic parameter of the first sub-band is different from the physical layer basic parameter of the second sub-band. The method also includes communicating, by the network device, with the user equipment by using the second sub-band.

With reference to the first aspect, in a first possible implementation, the configuration information further includes at least one of a location, bandwidth, the physical layer basic parameter, a frequency range, a frequency center point, a load status, a type identifier of a supported service, or a priority of the second sub-band.

With reference to the first aspect or the first possible implementation of the first aspect, in a second possible implementation, the physical layer basic parameter includes at least one of subcarrier bandwidth, a transmission time interval (TTI), a symbol length, a symbol quantity, or a cyclic prefix (CP) length.

With reference to the first aspect, or the first or the second possible implementation of the first aspect, in a third possible implementation, the determining, by a network device, a first sub-band and a second sub-band includes: determining, by the network device, the first sub-band according to a service environment type, and determining the second sub-band according to a service type.

With reference to any one of the first aspect, or the first to the third possible implementations of the first aspect, in a fourth possible implementation, the method further includes: sending, by the network device, configuration information of a third sub-band on the first sub-band, where when the second sub-band is an uplink sub-band, the third sub-band is a downlink sub-band, or when the second sub-band is a downlink sub-band, the third sub-band is an uplink sub-band.

With reference to any one of the first aspect, or the first to the fourth possible implementations of the first aspect, in a fifth possible implementation, the method further includes: sending, by the network device, information about an uplink sub-band corresponding to the first sub-band on the first sub-band, where the uplink sub-band corresponding to the first sub-band is matched with a TTI of the first sub-band.

With reference to any one of the first aspect, or the first to the fifth possible implementations of the first aspect, in a sixth possible implementation, the method further includes: when the second sub-band is a downlink sub-band, sending, by the network device, information about an uplink sub-band corresponding to the second sub-band on the first sub-band, where the uplink sub-band corresponding to the second sub-band is matched with a TTI of the second sub-band; or when the second sub-band is an uplink sub-band, sending, by the network device, information about a downlink sub-band corresponding to the second sub-band on the first sub-band, where the downlink sub-band corresponding to the second sub-band is matched with a TTI of the second sub-band.

With reference to any one of the first aspect, or the first to the sixth possible implementations of the first aspect, in a seventh possible implementation, the method further includes: if the network device determines that a sub-band needs to be reconfigured, obtaining configuration information of each reconfigured sub-band; and sending, by the network device, the configuration information of each reconfigured sub-band by using the first sub-band; or sending, by the network device, the configuration information of each reconfigured sub-band to idle-state user equipment by using the first sub-band, and sending, by using the second sub-band, the configuration information of each reconfigured sub-band to user equipment that transmits a service on the second sub-band.

With reference to the seventh possible implementation of the first aspect, in an eighth possible implementation, the method further includes: when the sub-band is periodically reconfigured, at a preset moment before a reconfiguration period starts, changing, by the network device, a status value of a reconfiguration flag bit to a sub-band reconfiguration preparation state, and when the reconfiguration period starts, changing, by the network device, the status value of the reconfiguration flag bit to a reconfiguration complete state.

A second aspect of the present application provides a communication method. The method includes receiving, by user equipment, configuration information of a second sub-band from a first-sub band, where the configuration information of the second sub-band includes identification information of the second sub-band. The method also includes determining, by the user equipment, a physical layer basic parameter of the second sub-band according to the identification information of the second sub-band, where a physical layer basic parameter of the first sub-band is different from the physical layer basic parameter of the second sub-band. The method also includes communicating, by the user equipment, with a network device using the second sub-band.

With reference to the second aspect, in a first possible implementation, the configuration information further includes at least one of a location, bandwidth, the physical layer basic parameter, a frequency range, a frequency center point, a load status, a type identifier of a supported service, or a priority of the second sub-band.

With reference to the second aspect or the first possible implementation of the second aspect, in a second possible implementation, the physical layer basic parameter includes at least one of subcarrier bandwidth, a transmission time interval (TTI), a symbol length, a symbol quantity, or a cyclic prefix (CP) length.

With reference to the second aspect, or the first or the second possible implementation of the second aspect, in a third possible implementation, the method further includes: receiving, by the user equipment, configuration information of a third sub-band from the first sub-band, where when the second sub-band is an uplink sub-band, the third sub-band is a downlink sub-band, or when the second sub-band is a downlink sub-band, the third sub-band is an uplink sub-band.

With reference to any one of the second aspect, or the first to the third possible implementations of the second aspect, in a fourth possible implementation, the method further includes: receiving, by the user equipment, information about an uplink sub-band corresponding to the first sub-band from the first sub-band, where the uplink sub-band corresponding to the first sub-band is matched with a TTI of the first sub-band.

With reference to any one of the second aspect, or the first to the fourth possible implementations of the second aspect, in a fifth possible implementation, the method further includes: when the second sub-band is a downlink sub-band, receiving, by the user equipment, information about an uplink sub-band corresponding to the second sub-band from the first sub-band, where the uplink sub-band corresponding to the second sub-band is matched with a TTI of the second sub-band; or when the second sub-band is an uplink sub-band, receiving, by the user equipment, information about a downlink sub-band corresponding to the second sub-band from the first sub-band, where the downlink sub-band corresponding to the second sub-band is matched with a TTI of the second sub-band.

With reference to any one of the second aspect, or the first to the fifth possible implementations of the second aspect, in a sixth possible implementation, the method further includes: after sub-band reconfiguration, receiving, by the user equipment, configuration information of each reconfigured sub-band from the first sub-band.

With reference to any one of the second aspect, or the first to the fifth possible implementations of the second aspect, in a seventh possible implementation, after sub-band reconfiguration, when the user equipment is transmitting a service by using the second sub-band, the user equipment receives configuration information of each reconfigured sub-band from the second sub-band to which the user equipment is connected, where the second sub-band to which the user equipment is connected is a downlink sub-band; and after the sub-band reconfiguration, when the user equipment is in an idle state, the user equipment receives the configuration information of each reconfigured sub-band from the first sub-band.

With reference to the sixth or the seventh possible implementation of the second aspect, in an eighth possible implementation, when identifying that a status value of a sub-band reconfiguration flag bit is in a sub-band reconfiguration preparation state, the user equipment stops accessing the second sub-band.

A third aspect of the present application provides a network device. The network device includes a processing unit, configured to determine a first sub-band and a second sub-band. The network device also includes a transceiver unit, configured to: send configuration information of the second sub-band to user equipment on the first sub-band, and communicate with the user equipment by using the second sub-band, where the configuration information of the second sub-band includes identification information of the second sub-band, the identification information of the second sub-band is used by the user equipment to determine a physical layer basic parameter of the second sub-band, and a physical layer basic parameter of the first sub-band is different from the physical layer basic parameter of the second sub-band.

With reference to the third aspect, in a first possible implementation, the configuration information further includes at least one of a location, bandwidth, the physical layer basic parameter, a frequency range, a frequency center point, a load status, a type identifier of a supported service, or a priority of the second sub-band.

With reference to the third aspect or the first possible implementation of the third aspect, in a second possible implementation, the physical layer basic parameter includes at least one of subcarrier bandwidth, a transmission time interval (TTI), a symbol length, a symbol quantity, or a cyclic prefix (CP) length.

With reference to the third aspect, or the first or the second possible implementation of the third aspect, in a third possible implementation, the processing unit is specifically configured to determine the first sub-band according to a service environment type, and determine the second sub-band according to a service type.

With reference to any one of the third aspect, or the first to the third possible implementations of the third aspect, in a fourth possible implementation, the transceiver unit is further configured to send configuration information of a third sub-band on the first sub-band, where when the second sub-band is an uplink sub-band, the third sub-band is a downlink sub-band, or when the second sub-band is a downlink sub-band, the third sub-band is an uplink sub-band.

With reference to any one of the third aspect, or the first to the fourth possible implementations of the third aspect, in a fifth possible implementation, the transceiver unit is further configured to send information about an uplink sub-band corresponding to the first sub-band on the first sub-band, where the uplink sub-band corresponding to the first sub-band is matched with a TTI of the first sub-band.

With reference to any one of the third aspect, or the first to the fifth possible implementations of the third aspect, in a sixth possible implementation, the transceiver unit is further configured to: when the second sub-band is a downlink sub-band, send information about an uplink sub-band corresponding to the second sub-band on the first sub-band, where the uplink sub-band corresponding to the second sub-band is matched with a TTI of the second sub-band; or when the second sub-band is an uplink sub-band, send information about a downlink sub-band corresponding to the second sub-band on the first sub-band, where the downlink sub-band corresponding to the second sub-band is matched with a TTI of the second sub-band.

With reference to any one of the third aspect, or the first to the sixth possible implementations of the third aspect, in a seventh possible implementation, the processing unit is further configured to: if a sub-band needs to be reconfigured, obtain configuration information of each reconfigured sub-band; and the transceiver unit is further configured to: send the configuration information of each reconfigured sub-band by using the first sub-band; or send the configuration information of each reconfigured sub-band to idle-state user equipment by using the first sub-band, and send, by using the second sub-band, the configuration information of each reconfigured sub-band to user equipment that transmits a service on the second sub-band.

With reference to the seventh possible implementation of the third aspect, in an eighth possible implementation, the processing unit is further configured to: when the sub-band is periodically reconfigured, at a preset moment before a reconfiguration period starts, change, a status value of a reconfiguration flag bit to a sub-band reconfiguration preparation state, and when the reconfiguration period starts, change, the status value of the reconfiguration flag bit to a reconfiguration complete state.

A fourth aspect of the present application provides user equipment. The user equipment includes a transceiver unit, configured to receive configuration information of a second sub-band from a first sub-band, where the configuration information of the second sub-band includes identification information of the second sub-band. The user equipment also includes a processing unit, configured to determine a physical layer basic parameter of the second sub-band according to the identification information that is of the second sub-band and that is received by the transceiver unit, where a physical layer basic parameter of the first sub-band is different from the physical layer basic parameter of the second sub-band. The transceiver unit is further configured to communicate with a network device by using the second sub-band.

With reference to the fourth aspect, in a first possible implementation, the configuration information further includes at least one of a location, bandwidth, the physical layer basic parameter, a frequency range, a frequency center point, a load status, a type identifier of a supported service, or a priority of the second sub-band.

With reference to the fourth aspect or the first possible implementation of the fourth aspect, in a second possible implementation, the physical layer basic parameter includes at least one of subcarrier bandwidth, a transmission time interval (TTI), a symbol length, a symbol quantity, or a cyclic prefix (CP) length.

With reference to the fourth aspect, or the first or the second possible implementation of the fourth aspect, in a third possible implementation, the transceiver unit is further configured to receive configuration information of a third sub-band from the first sub-band, where when the second sub-band is an uplink sub-band, the third sub-band is a downlink sub-band, or when the second sub-band is a downlink sub-band, the third sub-band is an uplink sub-band.

With reference to any one of the fourth aspect, or the first to the third possible implementations of the fourth aspect, in a fourth possible implementation, the transceiver unit is further configured to receive information about an uplink sub-band corresponding to the first sub-band from the first sub-band, where the uplink sub-band corresponding to the first sub-band is matched with a TTI of the first sub-band.

With reference to any one of the fourth aspect, or the first to the fourth possible implementations of the fourth aspect, in a fifth possible implementation, the transceiver unit is further configured to: when the second sub-band is a downlink sub-band, receive information about an uplink sub-band corresponding to the second sub-band from the first sub-band, where the uplink sub-band corresponding to the second sub-band is matched with a TTI of the second sub-band; or when the second sub-band is an uplink sub-band, receive information about a downlink sub-band corresponding to the second sub-band from the first sub-band, where the downlink sub-band corresponding to the second sub-band is matched with a TTI of the second sub-band.

With reference to any one of the fourth aspect, or the first to the fifth possible implementations of the fourth aspect, in a sixth possible implementation, the transceiver unit is further configured to: after sub-band reconfiguration, receive configuration information of each reconfigured sub-band from the first sub-band.

With reference to any one of the fourth aspect, or the first to the fifth possible implementations of the fourth aspect, in a seventh possible implementation, the transceiver unit is further configured to: after sub-band reconfiguration, when the user equipment is transmitting a service by using the second sub-band, receive configuration information of each reconfigured sub-band from the second sub-band to which the user equipment is connected, where the second sub-band to which the user equipment is connected is a downlink sub-band; and after the sub-band reconfiguration, when the user equipment is in an idle state, receive the configuration information of each reconfigured sub-band from the first sub-band.

With reference to the sixth or the seventh possible implementation of the fourth aspect, in an eighth possible implementation, the processing unit is further configured to: when identifying that a status value of a sub-band reconfiguration flag bit is in a sub-band reconfiguration preparation state, stop accessing the second sub-band.

A fifth aspect of the present application provides a wireless communications system, including a network device and user equipment. The network device is the network device according to the third aspect or any possible implementation of the third aspect. The user equipment is the user equipment according to the fourth aspect or any possible implementation of the fourth aspect.

In the current system, one carrier has only one type of waveform and one type of physical layer basic parameter, and consequently, a multi-service requirement cannot be met. By contrast, according to the communication method provided in the embodiments of the present application, the network device may send configuration information of sub-bands with different physical layer basic parameters to the user equipment, and the network device and the user equipment may communicate with each other by using different sub-bands, so that a requirement for communication service diversity is met.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person skilled in the art may still derive other drawings from these accompanying drawings without creative efforts.

DETAILED DESCRIPTION OF ILLUSTRATIVE EMBODIMENTS

Figure 1:
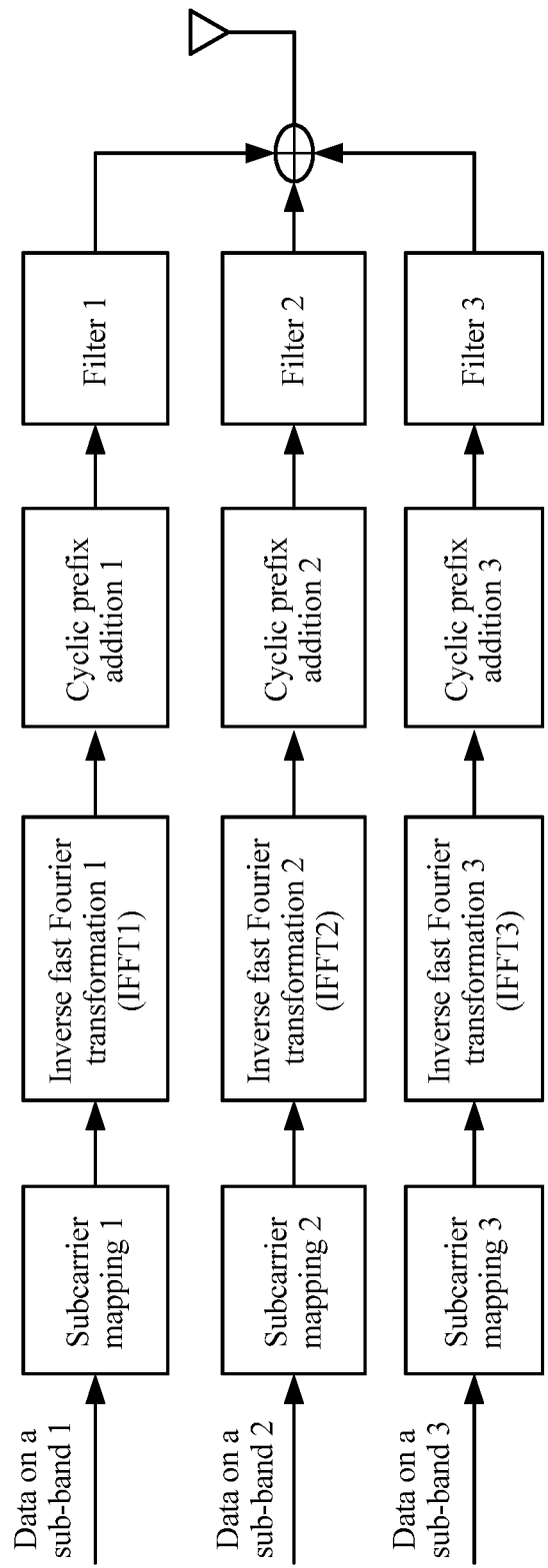
FIG. 1 is a simplified block diagram of a filtered orthogonal frequency division multiplexing (F-OFDM) processing process.

Embodiments of the present application provide a communication method. A network device may send configuration information of sub-bands with different physical layer basic parameters to user equipment, and the network device and the user equipment may communicate with each other by using different sub-bands, so that a requirement for communication service diversity is met. The embodiments of the present application further provide a corresponding device and system. Details are separately described below.

The following clearly describes the technical solutions in the embodiments of the present application with reference to the accompanying drawings in the embodiments of the present application. Apparently, the described embodiments are merely some but not all of the embodiments of the present application. All other embodiments obtained by a person skilled in the art based on the embodiments of the present application without creative efforts shall fall within the protection scope of the present application.

It should be understood that the technical solutions of the embodiments of the present application may be applied to various communications systems, such as a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, a future 5G communications system, and the like.

A communications system used in the embodiments of the present application includes user equipment and a network device.

The user equipment may communicate with one or more core networks by using a radio access network (RAN). The user equipment (UE) may be access user equipment, a subscriber unit, a subscriber station, a mobile station, a mobile node, a remote station, remote user equipment, a mobile device, a wireless communications device, a user agent, or a user apparatus. The access user equipment may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, user equipment in a future 5G network, or the like.

The network device may be a device configured to communicate with the user equipment. For example, the network device may be a network device (BTS) in a GSM system or a CDMA system, a network device (for example a NodeB (NB)) in a WCDMA system, or an evolved network device (for example an Evolutional Node B, "eNB" or "eNodeB" for short) in an LTE system. Alternatively, the network device may be a relay node, an access point, an in-vehicle device, a wearable device, a network side device in a future 5G network, a network device in a future evolved PLMN network, or the like.

Filtered orthogonal frequency division multiplexing (F-OFDM) is an improved orthogonal frequency division multiplexing technology. A basic rule of the orthogonal frequency division multiplexing technology is as follows. A carrier is divided into different sub-bands, each sub-band is filtered, and specific guard space is reserved on a sub-band edge, so that sub-bands are not related to each other, and the sub-bands do not affect each other. Bandwidth of the sub-bands may be different. Bandwidth of a sub-band is determined according to a service requirement.

FIG. 1 is a simplified block diagram of an F-OFDM processing process. As shown in FIG. 1, a carrier is divided into N sub-bands. Each sub-band occupies specific bandwidth. Data on each sub-band is processed independently. Configuration information of the sub-bands may be different. Finally, the sub-carriers are separately filtered and overlaid together, and are transmitted through an air interface. Physical layer basic parameters (numerology) of different sub-bands may be the same, or may be different. A physical layer basic parameter of a sub-band includes at least one of parameters such as subcarrier bandwidth, a transmission time interval (TTI) length, a symbol length, a symbol quantity, and a cyclic prefix (CP) length. The physical layer basic parameter of the sub-band may be preconfigured, or may be flexibly configured according to a status such as a service load status. Generally, sub-bands configured with different physical layer basic parameters are applicable to different service types. In this embodiment of the present application, that physical layer basic parameters of sub-bands are different may be that one or more parameters of subcarrier bandwidth, a transmission time interval (TTI) length, a symbol length, a symbol quantity, and a cyclic prefix (CP) length are different. For example, TTIs of different sub-bands are different.

In this embodiment of the present application, configuration information of a sub-band is used by the user equipment or a network device to locate and use the sub-band. The configuration information of the sub-band may include a location and bandwidth that are of the sub-band and that are currently configured in a system, and may include a physical layer basic parameter of the sub-band, or may not include a physical layer basic parameter of the sub-band. The configuration information may include identification information of the sub-band. If the configuration information includes the physical layer basic parameter of the sub-band, the physical layer basic parameter of the sub-band needs to be determined in preconfigured physical layer basic parameters by using the identification information of the sub-band. In addition, optionally, the configuration information of the sub-band may further include a frequency range of the sub-band, a frequency center point of the sub-band, a load status or an idle state of the sub-band, a coverage status or a power level of the sub-band, a service type identifier, a priority of the sub-band, a correspondence between an uplink sub-band and a downlink sub-band, and the like.

In F-OFDM, sub-bands can be filtered, so that the sub-bands do not affect each other. Therefore, different physical layer basic parameters can be configured for the sub-bands, to adapt to different service features and environment features. Services with different features are placed on most appropriate sub-bands for transmission, so that performance of the entire system is improved. In this way, there is no obvious interference between the sub-bands, and performance of the system or the sub-bands is not affected.

To achieve the foregoing objective, in the embodiments of the present application, a sub-band division, configuration, and reconfiguration method and a related solution for notifying user equipment of sub-band information are designed.

Figure 2:
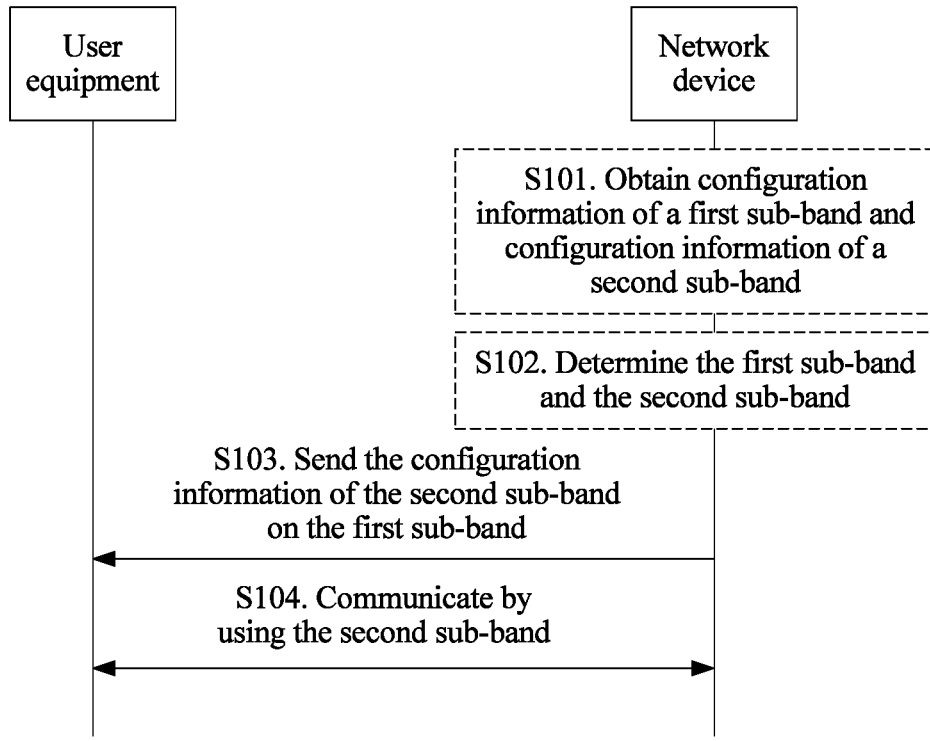
FIG. 2 is a schematic diagram of an embodiment of a communication method according to an embodiment of the present application.

Referring to FIG. 2, an embodiment of a communication method provided in an embodiment of the present application includes the following steps.

S101. A network device obtains configuration information of a first sub-band and configuration information of a second sub-band, where the configuration information of the second sub-band includes identification information of the second sub-band, the identification information of the second sub-band is used by the user equipment to determine a physical layer basic parameter of the second sub-band, and a physical layer basic parameter of the first sub-band is different from the physical layer basic parameter of the second sub-band.

In this embodiment of the present application, there may be one or more second sub-bands.

The configuration information of the first sub-band and the configuration information of the second sub-band may be obtained in multiple manners. For example, the configuration information of the first sub-band and the configuration information of the second sub-band are read from a preset file.

Optionally, the configuration information further includes at least one of a location, bandwidth, the physical layer basic parameter, a frequency range, a frequency center point, a load status, a type identifier of a supported service, or a priority of the second sub-band.

Optionally, the physical layer basic parameter includes at least one of subcarrier bandwidth, a transmission time interval (TTI), a symbol length, a symbol quantity, or a cyclic prefix (CP) length.

S102. The network device determines the first sub-band and the second sub-band.

Optionally, that the network device determines the first sub-band and the second sub-band may include: determining, by the network device, the first sub-band according to a service environment type, and determining the second sub-band according to a service type.

In this embodiment of the present application, the service environment type is a service environment in which the network device is located. For example, when the network device is compatible with a Long Term Evolution (LTE) system at the same time, the service environment type is an LTE type. When the network device needs to be compatible with another 2G or 3G communications system, the service environment type is a type of the another 2G or 3G communications system.

Optionally, a downlink sub-band in the downlink carrier bandwidth is obtained by means of division according to a downlink service requirement, and an uplink sub-band in uplink carrier bandwidth is obtained by means of division according to an uplink service requirement. When the downlink service requirement is different from the uplink service requirement, division of the downlink sub-band is different from division of the uplink sub-band.

S103. The network device sends the configuration information of the second sub-band on the first sub-band.

S104. After receiving the configuration information, of the second sub-band, sent by the network device, the user equipment communicates with the network device by using the second sub-band.

In the current system, one carrier has only one type of waveform and one type of physical layer basic parameter, and consequently, a multi-service requirement cannot be met. By contrast, according to the communication method provided in this embodiment of the present application, the network device may send configuration information of sub-bands with different physical layer basic parameters to the user equipment, and the network device and the user equipment may communicate with each other by using different sub-bands, so that a requirement for communication service diversity is met.

Optionally, the method further includes: sending, by the network device, configuration information of a third sub-band on the first sub-band; and receiving, by the user equipment, the configuration information of the third sub-band from the first sub-band.

When the second sub-band is an uplink sub-band, the third sub-band is a downlink sub-band. When the second sub-band is a downlink sub-band, the third sub-band is an uplink sub-band.

Optionally, the method further includes: When the user equipment accesses the first sub-band, the network device further hands over, according to a service type of the user equipment, the user equipment to a second sub-band corresponding to the service type.

In this embodiment of the present application, a communications system usually includes a frequency division duplex (FDD) system and a time division duplex (TDD) system. In the FDD system, a spectrum range of an uplink frequency resource is different from that of a downlink frequency resource, and uplink data transmission and downlink data transmission can be simultaneously performed. In the TDD system, a spectrum range of an uplink frequency resource is the same as that of a downlink frequency resource, but uplink transmission and downlink transmission are performed at different times. Spectrum resources within the range are alternatively used in uplink and downlink.

The FDD system is an uplink-downlink frequency division system. To simplify a design for applying an F-OFDM waveform technology to an actual system, consideration is taken from the entire system, to avoid an excessively complex design of another necessary function such as a hybrid automatic repeat request (HARQ), synchronization, broadcasting, and scheduling. In addition, a requirement for future service diversity needs to be considered and met. F-OFDM sub-band division is designed as shown in FIG. 3 and FIG. 4.

Figure 3:
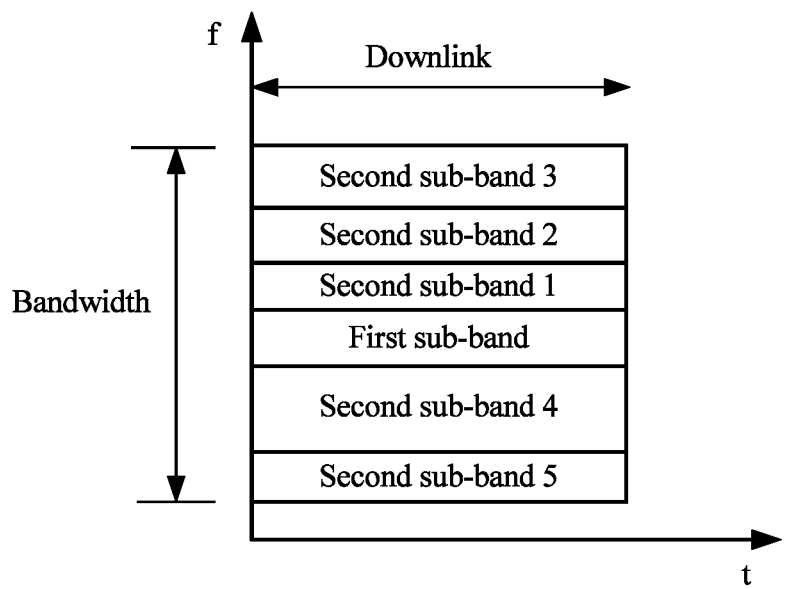
FIG. 3 is a schematic diagram of downlink sub-band division according to an embodiment of the present application.

FIG. 3 is a schematic diagram of downlink sub-band division in an FDD system. FIG. 4 is a schematic diagram of uplink sub-band division in an FDD system.

Figure 4:
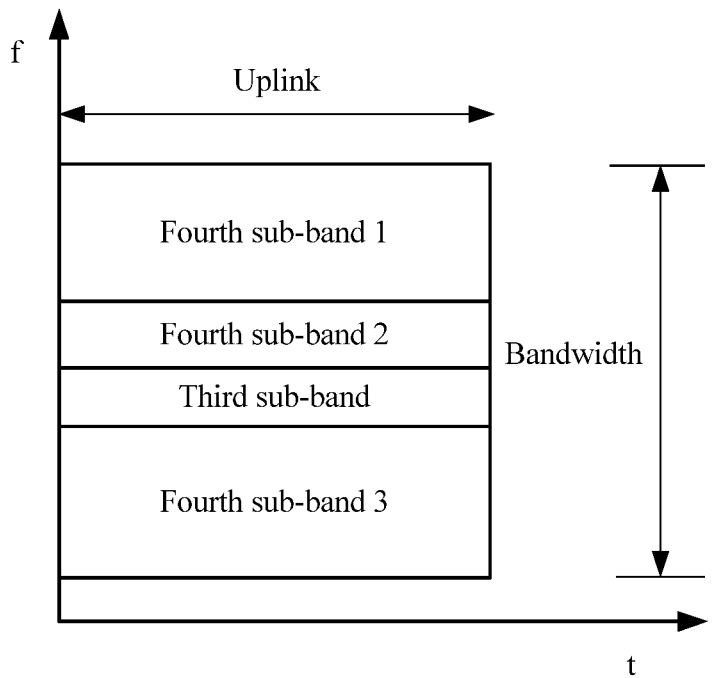
FIG. 4 is a schematic diagram of uplink sub-band division according to an embodiment of the present application.

There may be multiple sub-bands, and the sub-bands are not necessarily sub-bands shown in FIG. 3 and FIG. 4. There may be n (n≥1) sub-bands. Bandwidth of a sub-band may be configured according to a requirement.

One primary sub-band and multiple secondary sub-bands may be defined on a downlink sub-band. A downlink primary sub-band is mainly used for transmitting a system message and transmitting configuration information of a secondary sub-band. A downlink secondary sub-band is mainly used for transmitting downlink service data. For example, in FIG. 3, a first sub-band may be considered as a downlink primary sub-band, and second sub-bands 1 to 5 may be considered as downlink secondary sub-bands.

Actually, there may be an uplink primary sub-band and an uplink secondary sub-band on an uplink sub-band. The uplink primary sub-band is mainly used for transmitting a response message of a message received from the downlink primary sub-band. The uplink secondary sub-band is mainly used for transmitting uplink service data. For example, in FIG. 4, a third sub-band may be considered as an uplink primary sub-band, and fourth sub-bands 1 to 3 may be considered as uplink secondary sub-bands.

It should be noted that the second sub-band, the third sub-band, and the fourth sub-band in FIG. 3 and FIG. 4 are sequence numbers marked only for ease of description in the scenarios, and a second sub-band and a third sub-band described in the claims are not necessarily limited to the second sub-band and the third sub-band in FIG. 3 and FIG. 4.

In a possible implementation, the second sub-band in the claims may be considered as the second sub-bands 1 to 5 in FIG. 3, and the third sub-band in the claims may be considered as the third sub-band and the fourth sub-bands 1 to 3 in FIG. 4.

In sub-band division, a downlink carrier or an uplink carrier may be divided into multiple sub-bands with same or different bandwidth. Any sub-band occupies at least one radio frame in a time domain. That is, the sub-band does not change in the radio frame.

Generally, user equipment first receives system information by using the first sub-band, and learns configuration information of the second sub-band and configuration information of the uplink sub-band.

A location of the first sub-band is usually set at a center point of a carrier frequency band, and initial bandwidth and a related parameter that are of the first sub-band may be set according to a default service environment in which a network device is located. Certainly, the first sub-band may not be located at a center point of a frequency band. This is not specifically limited in this embodiment of the present application.

It is necessary to set the first sub-band, and bandwidth occupied by the first sub-band may be adjusted. To be compatible with a Long Term Evolution (LTE) system, a physical layer basic parameter of the first sub-band may be set to a typical parameter of the LTE system. For example, a value of a TTI is 1 ms, a waveform is typical OFDM, and a subcarrier spacing is 15 KHz.

The network device delivers, on the first sub-band, the configuration information of the second sub-band and the configuration information of the uplink sub-band to user equipment within a coverage area.

Usually, during initial access, the user equipment first accesses the first sub-band. After accessing the first sub-band, the network device may hand over, according to a service feature of the user equipment, the user equipment to a corresponding second sub-band for working. The user equipment may simultaneously perform different services. Therefore, the user equipment may simultaneously work on multiple second sub-bands.

In this embodiment of the present application, the network device further configures a correspondence between the downlink sub-band and the uplink sub-band, and sends the correspondence to the user equipment by using the first sub-band. The correspondence is used to indicate that the user equipment feeds back response data on the uplink sub-band in the correspondence. The response data is fed back according to data received on the downlink sub-band in the correspondence. For example, the correspondence includes a second sub-band 1 and a fourth sub-band 3, and for data received by the user equipment on the second sub-band 1, response data needs to be fed back to the network device on the fourth sub-band 3.

Optionally, the method further includes: sending, by the network device, information about an uplink sub-band corresponding to the first sub-band on the first sub-band; and receiving, by the user equipment, the information about the uplink sub-band corresponding to the first sub-band from the first sub-band.

The uplink sub-band corresponding to the first sub-band is matched with a TTI of the first sub-band.

The information about the uplink sub-band corresponding to the first sub-band may be represented by using a correspondence. The information about the uplink sub-band corresponding to the first sub-band may be preconfigured, or may be dynamically configured by the network device.

Optionally, the method further includes: when the second sub-band is a downlink sub-band, sending, by the network device, information about an uplink sub-band corresponding to the second sub-band on the first sub-band; and when the second sub-band is a downlink sub-band, receiving, by the user equipment, the information about the uplink sub-band corresponding to the second sub-band from the first sub-band, where the uplink sub-band corresponding to the second sub-band is matched with a TTI of the second sub-band; or when the second sub-band is an uplink sub-band, sending, by the network device, information about a downlink sub-band corresponding to the second sub-band on the first sub-band; and when the second sub-band is an uplink sub-band, receiving, by the user equipment, the information about the downlink sub-band corresponding to the second sub-band from the first sub-band, where the downlink sub-band corresponding to the second sub-band is matched with a TTI of the second sub-band.

When the second sub-band is a downlink sub-band, the information about the uplink sub-band corresponding to the second sub-band may be preconfigured, or may be dynamically configured by the network device. Alternatively, when the second sub-band is an uplink sub-band, the information about the downlink sub-band corresponding to the second sub-band may be preconfigured, or may be dynamically configured by the network device.

When the second sub-band is a downlink sub-band, after receiving downlink data from the second sub-band according to the information about the uplink sub-band corresponding to the second sub-band, the user equipment feeds back response data to the network device on the at least one uplink sub-band corresponding to the second sub-band.

When the second sub-band is an uplink sub-band, after receiving data from the downlink sub-band corresponding to the second sub-band, the user equipment feeds back response data on the second sub-band.

A relationship between an uplink sub-band and a downlink sub-band in the foregoing embodiment may be expressed in a correspondence.

Usually, in the FDD system, a downlink service occupies bandwidth of a frequency band, and an uplink service occupies bandwidth of another frequency band. Usually, there needs to be a correspondence between an uplink sub-band and a downlink sub-band. Only a downlink sub-band in a special situation does not need an uplink sub-band associated with the downlink sub-band. For example, a sub-band used for a broadcasting service may have no associated uplink sub-band.

Figure 5:
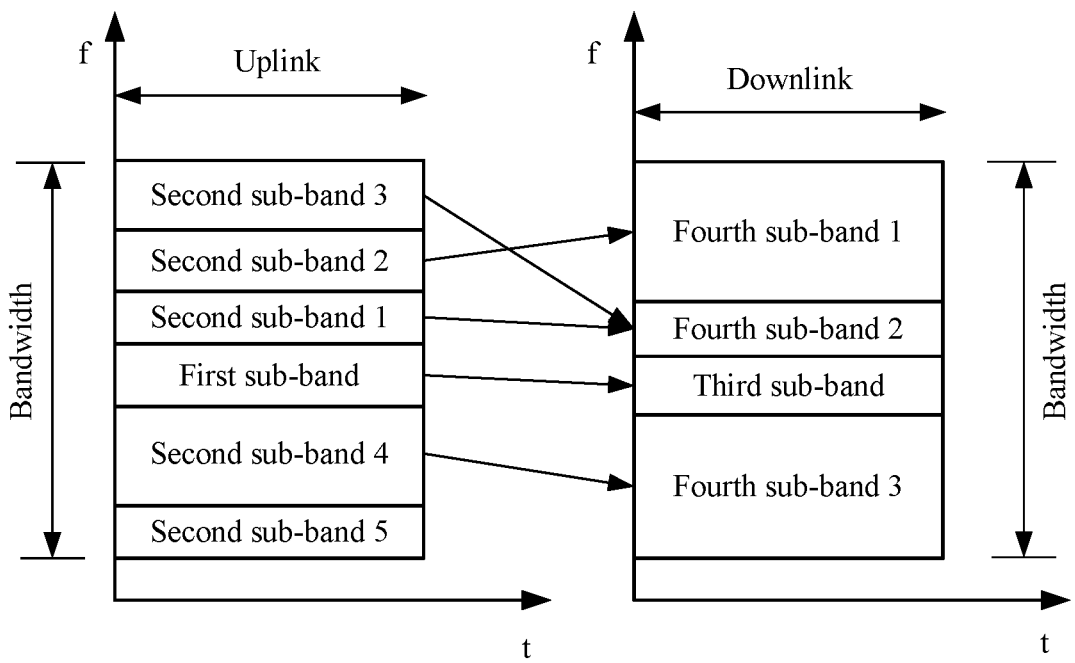
FIG. 5 is a schematic diagram of a correspondence between an uplink sub-band and a downlink sub-band in an FDD system according to an embodiment of the present application.

FIG. 5 is a schematic diagram of association between an uplink sub-band and a downlink sub-band in an FDD system.

As shown in FIG. 5, the downlink sub-band includes a first sub-band and second sub-bands 1 to 5, and the uplink sub-band includes a third sub-band and fourth sub-bands 1 to 3. There is a correspondence described above between the first sub-band and the third sub-band. Such a relationship is referred to as a correspondence below. The second sub-band 1 is corresponding to the fourth sub-band 2, the second sub-band 2 is corresponding to the fourth sub-band 1, the second sub-band 3 is corresponding to the fourth sub-band 2, and the second sub-band 4 is corresponding to the fourth sub-band 3. There is no uplink sub-band corresponding to the second sub-band 5.

It may be learned from FIG. 5 that there is always an asymmetrical correspondence between an uplink sub-band and a downlink sub-band regardless of bandwidth or a relative location on a carrier. The correspondence between an uplink sub-band and a downlink sub-band is configured according to an uplink service requirement and a downlink service requirement. The uplink sub-band and the downlink sub-band may not be in a one-to-one correspondence. Certainly, the uplink sub-band and the downlink sub-band may be in a one-to-one correspondence, or may be in a one-to-many correspondence, a many-to-one correspondence, or a many-to-many correspondence. That is, two or more downlink sub-bands may be corresponding to a same uplink sub-band, or a downlink sub-band may be corresponding to multiple uplink sub-bands. Such a correspondence between an uplink sub-band and a downlink sub-band may be set during system initialization, or may be dynamically adjusted according to a requirement in a system running process, to adapt to a dynamic change in a service scenario.

For example, both the second sub-band 3 and the second sub-band 1 in downlink are corresponding to the fourth sub-band 2 in uplink. There is no uplink sub-band corresponding to the second sub-band 5. This indicates that there is no uplink service corresponding to the second sub-band 5 in downlink, and the second sub-band 5 may be a sub-band used for a broadcasting service.

In addition, it should be noted that uplink sub-band division and downlink sub-band division are independent of each other. Configuration information of the downlink sub-band and configuration information of the uplink sub-band are also independently configured. Uplink is different from downlink in terms of a service feature. Therefore, to better transmit respective services, the uplink sub-band and the downlink sub-band also require independent configuration information. For example, typically, if an uplink service volume and a downlink service volume are asymmetrical, different bandwidth may be configured for an uplink sub-band corresponding to a downlink sub-band. For another example, different waveforms are used in uplink and downlink, and this is also typical setting.

In addition, for an entire carrier, uplink carrier bandwidth and downlink carrier bandwidth may be different, and may be adjusted according to an uplink service, a downlink service, and available bandwidth.

To simplify a system design, a TTI of the uplink sub-band usually needs to match a TTI of the downlink sub-band in the foregoing correspondence, that is, a same TTI length is used. Alternatively, a TTI of the downlink sub-band needs to be an integer multiple of a TTI of the uplink sub-band, to ensure timely HARQ feedback.

For some special application scenarios or services, user equipment may directly access a corresponding secondary sub-band. There may be some special sub-bands.

A special sub-band is a special access sub-band specific to a special scenario or user equipment with a single function, to meet a scenario limitation or a function limitation.

The special sub-band is, for example, a sub-band used for machine type communication (MTC) in the Internet of Things. An MTC service is a basic service that needs to be supported by a 5G network. Because of a special requirement of MTC user equipment for costs or power consumption, user equipment that needs to support the MTC service in the system design can directly access a sub-band that supports the MTC service. An MTC sub-band provides fast access of a preset parameter, so that a network search time of the MTC user equipment is shortened and a capability requirement of the MTC user equipment is reduced.

The special sub-band is, for example, a sub-band used for access of high-speed moving user equipment. A high-speed access sub-band is for the high-speed moving user equipment. The first sub-band is designed to be accessed by common medium/low-speed moving user equipment, and it is difficult for the high-speed moving user equipment to access the first sub-band. Therefore, a dedicated sub-band used for access of the high-speed moving user equipment needs to be set.

The special sub-band is, for example, a sub-band used for broadcasting. The broadcasting sub-band is usually a downlink sub-band. The broadcasting sub-band is usually used for performing a broadcasting service in an entire coverage area.

Usually, the broadcasting sub-band does not need to be associated with a dedicated uplink sub-band.

However, in a large-range broadcasting service that is performed by using a cellular network, there may be an appeal that feedback from the user equipment is required or access to the broadcasting service is required. In this case, uplink data is only some signaling transmission or simple feedbacks. Therefore, the broadcasting sub-band may be randomly associated with any uplink sub-band.

The special sub-band is, for example, an empty sub-band. To reduce system interference and energy consumption, if a service volume is relatively small, and corresponding bandwidth resources are not required to perform a service, unnecessary bandwidth resources may form an empty sub-band. The empty sub-band, as the name indicates, is a sub-band that does not send any information, and configuration information of the empty sub-band is not sent in a sub-band broadcast message of the first sub-band.

The empty sub-band may be located on any location other than the first sub-band within a frequency band range of a network device. Sometimes, if some narrowband interference suddenly occurs in the system, an interference location may be reconfigured as an empty sub-band, to avoid impact exerted by the interference.

In a single-frequency network, the empty sub-band may be further used for coordinating spectrum allocation on a cell edge and reducing co-channel interference on the cell edge.

In this embodiment of the present application, a priority may be set for each second sub-band, and a priority may also be set for each uplink sub-band. A priority of a sub-band is set for distinguishing users or services with different priorities, so that a user or a service with a high priority can obtain a corresponding service resource, and satisfaction of the user or the service is ensured.

In this way, only a user with a relatively high priority can access some sub-bands with a high priority, so as to help ensure quality of service of an important user.

The priority does not need to be set for all user equipments or sub-bands. If the priority is not set for a sub-band or user equipment, a specific priority is used as a priority of the sub-band or the user equipment by default.

Sub-band frequency hopping: Because a single 5G carrier may reach bandwidth of hundreds of megabits, multiple sub-bands with different bandwidth may be obtained by means of division in bandwidth of each carrier, and to use frequency diversity gains of such high bandwidth, frequency hopping may be performed on the sub-bands.

There are multiple sub-band frequency hopping manners. For fixed-mode frequency hopping, several fixed frequency hopping modes may be set, and dynamic frequency hopping is performed according to a pre-estimated result of frequency diversity gains. User equipment in a connected mode is notified of a frequency hopping manner by means of broadcasting or unicasting in a system message.

Figure 6:
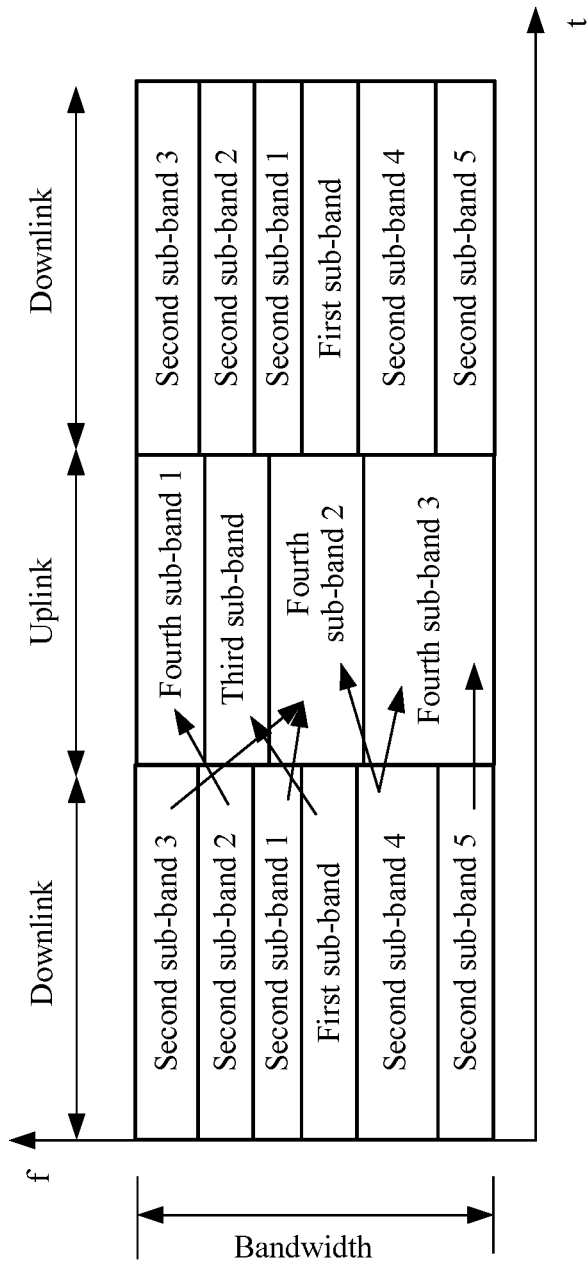
FIG. 6 is a schematic diagram of a correspondence between an uplink sub-band and a downlink sub-band in a TDD system according to an embodiment of the present application.

Uplink and downlink in a TDD system are distinguished according to a time. That is, an uplink service and a downlink service in the system occupy same carrier bandwidth, but the carrier bandwidth is used for the downlink service in a period of time, and is used for the uplink service in another period of time, and this is alternately performed in this way. FIG. 6 is a schematic diagram of typical sub-band division in the TDD system.

It may be learned from FIG. 6 that, in each of an uplink transmission time and a downlink transmission time, carrier bandwidth is divided into multiple sub-bands, and each sub-band occupies specific bandwidth. Sub-band division in the uplink time is independent of sub-band division in the downlink time.

In the TDD system, there is also a correspondence between an uplink sub-band and a downlink sub-band. The downlink sub-band includes a first sub-band and second sub-bands 1 to 5. The uplink sub-band includes a third sub-band and fourth sub-bands 1 to 3. There is a correspondence described above between the first sub-band and the third sub-band. Such a relationship is referred to as a correspondence below. The second sub-band 1 is corresponding to the fourth sub-band 2, the second sub-band 2 is corresponding to the fourth sub-band 1, the second sub-band 3 is corresponding to the fourth sub-band 2, the second sub-band 4 is corresponding to the fourth sub-band 2 and the fourth sub-band 3, and the second sub-band 5 is corresponding to the fourth sub-band 3.

For descriptions about the correspondence, refer to related descriptions in the FDD system for understanding, and details are not described herein.

Because of a change in a service or a communication environment, an existing sub-band in the system may not best adapt to a new service or environment. The sub-band needs to be readjusted, and configuration information is re-delivered to the readjusted sub-band, to best adapt to a service requirement or a communication environment status of the system. This relates to sub-band reconfiguration.

Optionally, if the network device determines that a sub-band needs to be reconfigured, the network device obtains configuration information of each reconfigured sub-band.

The network device sends the configuration information of each reconfigured sub-band by using the first sub-band.

Alternatively, the network device sends the configuration information of each reconfigured sub-band to idle-state user equipment by using the first sub-band, and sends, by using the second sub-band, the configuration information of each reconfigured sub-band to user equipment that transmits a service on the second sub-band.

After sub-band reconfiguration, the user equipment receives the configuration information of each reconfigured sub-band from the first sub-band.

After the sub-band reconfiguration, when the user equipment is transmitting a service by using the second sub-band, the user equipment receives the configuration information of each reconfigured sub-band from the second sub-band to which the user equipment is connected. The second sub-band to which the user equipment is connected is a downlink sub-band.

After the sub-band reconfiguration, when the user equipment is in an idle state, the user equipment receives the configuration information of each reconfigured sub-band from the first sub-band.

In this embodiment of the present application, after a sub-band is reconfigured, configuration information of the sub-band changes accordingly, and there is no actual value for the user equipment to obtain original configuration information. Therefore, when preparing reconfiguration, the network device delivers a reconfiguration flag bit by using the first sub-band. The reconfiguration flag bit may be delivered in a system message.

Optionally, when the sub-band is periodically reconfigured, at a preset moment before the reconfiguration period starts, the network device changes a status value of a reconfiguration flag bit to a sub-band reconfiguration preparation state, and when the reconfiguration period starts, the network device changes the status value of the reconfiguration flag bit to a reconfiguration complete state.

When identifying that the status value of the sub-band reconfiguration flag bit is in the sub-band reconfiguration preparation state, the user equipment stops accessing the second sub-band.

Figure 7:
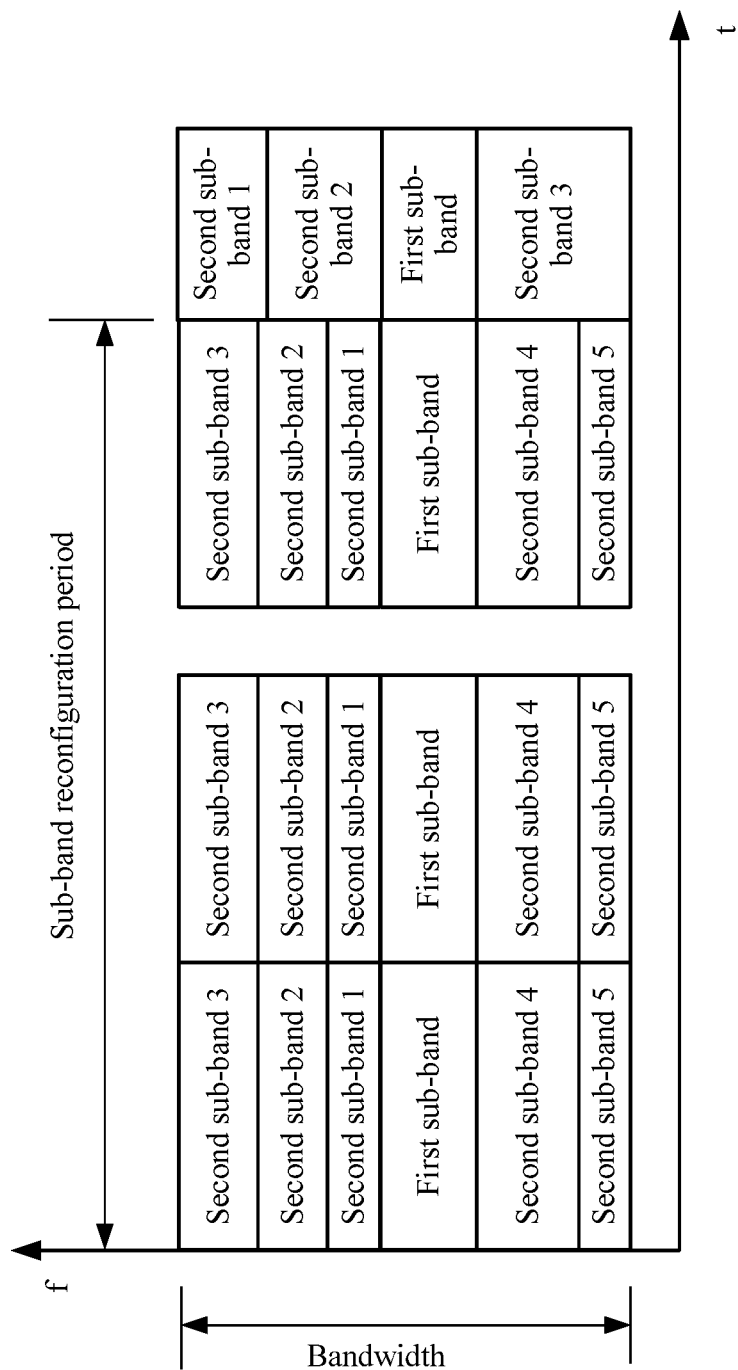
FIG. 7 is a schematic diagram of sub-band reconfiguration according to an embodiment of the present application.

FIG. 7 is a schematic diagram of sub-band reconfiguration. As shown in FIG. 7, a reconfiguration period of a sub-band is usually set in a system. Only when a reconfiguration period arrives, the sub-band is reconfigured in the system. During the reconfiguration period, the sub-band does not change. It may be learned from FIG. 7 that a reconfigured sub-band starts to be used in the system from the first frame in a next reconfiguration period. An unreconfigured downlink sub-band includes a first sub-band and second sub-bands 1 to 5. A reconfigured downlink sub-band includes a first sub-band and second sub-bands 1 to 3. Unreconfigured second sub-bands 1, 2, and 3 are different from the reconfigured second sub-bands 1, 2, and 3.

Sub-band reconfiguration is caused by a change in a service or a radio environment. For example, if a service volume increases, sub-band resources used for transmission that are corresponding to the service volume need to be increased, so as to meet a service requirement. On the contrary, sub-band bandwidth may be reduced, and resources are left for another service in demand. In addition, the change in the radio environment may also cause sub-band reconfiguration, so as to adapt to a change in an environment.

The reconfiguration period is an integer multiple of a radio frame, and is a fractional multiple of a system frame number period.

The sub-band needs to be reconfigured at a moment at which the sub-band reconfiguration period ends. The system runs according to a newly configured sub-band when a next sub-band reconfiguration period starts. The sub-band reconfiguration period is an integer multiple of a radio frame length, and is a fractional multiple of the system frame number period. One radio frame is generally 10 ms. One system frame number period generally includes 2048 radio frames. Certainly, as a requirement increases, the system frame number period may be expanded to 4096 radio frames.

For example, the system frame number period is 2048 radio frames (that is, system frame numbers are 0, 1, . . . , 2047). Therefore, the sub-band reconfiguration period may be set to 2048 radio frames, 1024 radio frames, 512 radio frames, or 256 radio frames. For example, the sub-band reconfiguration period is set to 512 radio frames, and a system frame number that can exactly divide 512 is a start location of a next reconfiguration period.

Usually, only bandwidth changes during reconfiguration of the first sub-band, and other information in the configuration information usually remains unchanged. When the second sub-band and the uplink sub-band are reconfigured, it is required that there is no UE service running on the sub-band, that is, the sub-band is unloaded. A sub-band reconfiguration rule is that a service of existing user equipment on a sub-band is not affected as far as possible.

Before the next reconfiguration period of the sub-band arrives, a sub-band reconfiguration notification message is broadcast by using the first sub-band, and the reconfiguration flag bit of the sub-band is set. Reconfiguration flag bit setting indicates that the sub-band needs to be reconfigured in the next reconfiguration period.

In several radio frames before each sub-band reconfiguration period ends, the network device starts to broadcast the sub-band reconfiguration notification message by using the first sub-band. The reconfiguration flag bit is carried in the reconfiguration notification message, to indicate that the sub-band needs to be reconfigured in the next reconfiguration period.

User equipment in a connected mode may be notified of configuration information of a reconfigured sub-band by using a unicast message, or may be notified of configuration information of a reconfigured sub-band by means of broadcasting. By means of unicasting, the user equipment in a connected mode may be informed of one or several specific sub-bands on which the user equipment is to receive a corresponding service after sub-band reconfiguration. In a broadcasting manner, user equipments that receive a service on the current sub-band may be instructed to uniformly receive a corresponding service on specified reconfigured sub-bands. If both a unicasting manner and a multicasting manner are used, for specific user equipment, a unicasting notification manner prevails.

Idle-state user equipment directly receives broadcast information from the first sub-band when a reconfiguration period starts, and obtains configuration information of a reconfigured sub-band.

When a new sub-band reconfiguration period starts, a reconfiguration flag bit of the sub-band is cleared, to indicate that no sub-band is reconfigured in the system currently.

If user equipment has services on at least two sub-bands, the user equipment needs to be notified of reconfiguration information of a sub-band only on one of the sub-bands.

System broadcasting is to enable the user equipment to quickly and correctly learn information about the current system, and is used for enabling the user equipment to quickly and accurately access a wireless communications system and smoothly perform various services supported by the system.

There are two cases. One case is that the UE can receive only one sub-band at one time. The other case is that the UE can receive multiple sub-bands at the same time.

The case in which the UE can receive only one sub-band at one time is as follows:

A two-level broadcasting solution is used in the system: Configuration information of the second sub-band, configuration information of the uplink sub-band, globally applicable broadcast information, and broadcast information related to the first sub-band are broadcast by using the first sub-band.

If UE on the second sub-band is in an active mode, the network device may send configuration information after reconfiguration on the second sub-band, and the UE receives the configuration information after reconfiguration on the second sub-band. In this way, the UE does not need to be handed over to the first sub-band to receive an updated system message.

If UE on the second sub-band is in a non-active mode, a message indicating that a primary system message is updated is broadcast on the second sub-band. After receiving the message, the UE is handed over to the first sub-band to receive system message update information. After the system message is updated, the UE is handed over to a secondary sub-band.

A case in which the UE can receive at least two sub-bands at the same time is as follows:

When performing a service on a sub-band, the UE can further receive a broadcast message of the first sub-band. Therefore, update of the broadcast message of the first sub-band does not need to be sent from the sub-band again.

In addition, another case is that the UE performs services on multiple sub-bands, and has no redundant capability to receive broadcast information on the first sub-band. In this case, the UE needs to temporarily stop a service on a sub-band, to receive update of the broadcast message on the first sub-band.

For standardization of an F-OFDM technology, the present application provides a matched design scheme that needs to be performed in a wireless communications system. According to this scheme, an F-OFDM technical value can be effectively used, and a capability of flexibly adapting to different services and application scenarios by a 5G system is provided.

Figure 8:
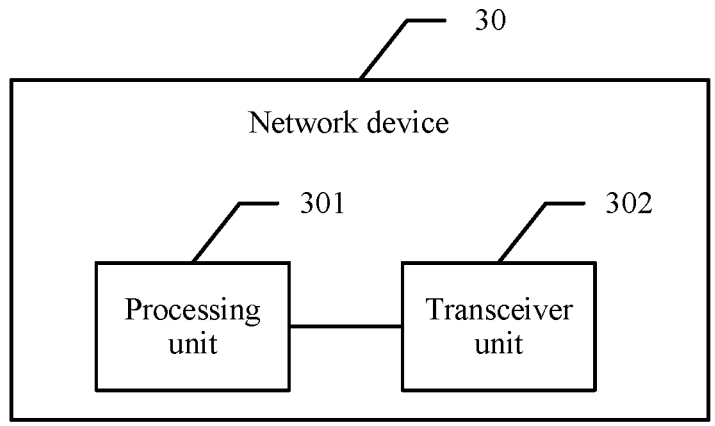
FIG. 8 is a schematic diagram of an embodiment of a network device according to an embodiment of the present application.

As shown in FIG. 8, an embodiment of a network device 30 according to an embodiment of the present application includes: a processing unit 301, configured to determine a first sub-band and a second sub-band; and a transceiver unit 302, configured to: send configuration information of the second sub-band to user equipment on the first sub-band determined by the processing unit 301, and communicate with the user equipment by using the second sub-band, where the configuration information of the second sub-band includes identification information of the second sub-band, the identification information of the second sub-band is used by the user equipment to determine a physical layer basic parameter of the second sub-band, and a physical layer basic parameter of the first sub-band is different from the physical layer basic parameter of the second sub-band.

In the current system, one carrier has only one type of waveform and one type of physical layer basic parameter, and consequently, a multi-service requirement cannot be met. By contrast, the network device provided in this embodiment of the present application may send configuration information of sub-bands with different physical layer basic parameters to the user equipment, and the network device and the user equipment may communicate with each other by using different sub-bands, so that a requirement for communication service diversity is met.

Optionally, the configuration information further includes at least one of a location, bandwidth, the physical layer basic parameter, a frequency range, a frequency center point, a load status, a type identifier of a supported service, or a priority of the second sub-band.

Optionally, the physical layer basic parameter includes at least one of subcarrier bandwidth, a transmission time interval (TTI), a symbol length, a symbol quantity, or a cyclic prefix (CP) length.

The processing unit 301 is specifically configured to determine the first sub-band according to a service environment type, and determine the second sub-band according to a service type.

Optionally, a downlink sub-band in the downlink carrier bandwidth is obtained by means of division according to a downlink service requirement, and an uplink sub-band in uplink carrier bandwidth is obtained by means of division according to an uplink service requirement. When the downlink service requirement is different from the uplink service requirement, division of the downlink sub-band is different from division of the uplink sub-band.

Optionally, the transceiver unit 302 is further configured to send configuration information of a third sub-band on the first sub-band. When the second sub-band is an uplink sub-band, the third sub-band is a downlink sub-band. When the second sub-band is a downlink sub-band, the third sub-band is an uplink sub-band.

Optionally, the transceiver unit 302 is further configured to send information about an uplink sub-band corresponding to the first sub-band on the first sub-band. The uplink sub-band corresponding to the first sub-band is matched with a TTI of the first sub-band.

Optionally, the transceiver unit 302 is further configured to: when the second sub-band is a downlink sub-band, send information about an uplink sub-band corresponding to the second sub-band on the first sub-band, where the uplink sub-band corresponding to the second sub-band is matched with a TTI of the second sub-band; or when the second sub-band is an uplink sub-band, send information about a downlink sub-band corresponding to the second sub-band on the first sub-band, where the downlink sub-band corresponding to the second sub-band is matched with a TTI of the second sub-band.

Optionally, the processing unit 301 is further configured to: if it is determined that a sub-band needs to be reconfigured, obtain configuration information of each reconfigured sub-band.

The transceiver unit 302 is further configured to: send the configuration information of each reconfigured sub-band by using the first sub-band; or send the configuration information of each reconfigured sub-band to idle-state user equipment by using the first sub-band, and send, by using the second sub-band, the configuration information of each reconfigured sub-band to user equipment that transmits a service on the second sub-band.

Optionally, the processing unit 301 is further configured to: when the sub-band is periodically reconfigured, at a preset moment before the reconfiguration period starts, change, by the network device, a status value of a reconfiguration flag bit to a sub-band reconfiguration preparation state, and when the reconfiguration period starts, change, by the network device, the status value of the reconfiguration flag bit to a reconfiguration complete state.

Optionally, the reconfiguration period is an integer multiple of a radio frame, and is a fractional multiple of a system frame number period.

For the embodiment or any optional embodiment of the foregoing network device, refer to related descriptions in FIG. 1 to FIG. 7 for understanding. Details are not described herein.

In the foregoing multiple embodiments, the transceiver unit may be an input/output device such as a network adapter, and the processing unit may be a processor.

Figure 9:
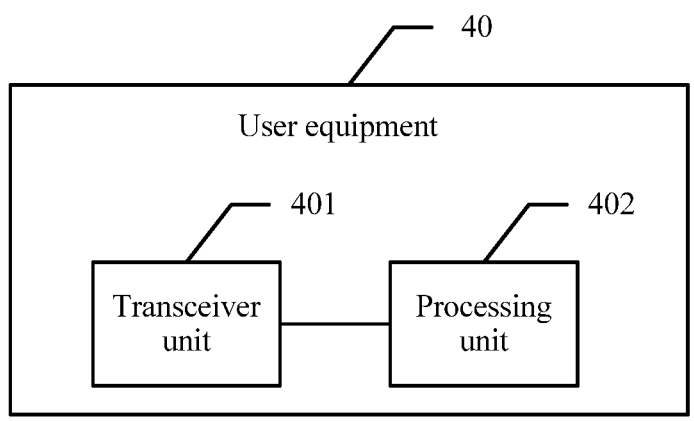
FIG. 9 is a schematic diagram of an embodiment of user equipment according to an embodiment of the present application.

As shown in FIG. 9, an embodiment of user equipment 40 according to an embodiment of the present application includes: a transceiver unit 401, configured to receive configuration information of a second sub-band from a first sub-band, where the configuration information of the second sub-band includes identification information of the second sub-band; and a processing unit 402, configured to determine a physical layer basic parameter of the second sub-band according to the identification information that is of the second sub-band and that is received by the receiving unit 401, where a physical layer basic parameter of the first sub-band is different from the physical layer basic parameter of the second sub-band.

The transceiver unit 401 is further configured to communicate with the network device by using the second sub-band.

In the current system, one carrier has only one type of waveform and one type of physical layer basic parameter, and consequently, a multi-service requirement cannot be met. By contrast, the user equipment in this embodiment of the present application and the network device may communicate with each other by using different sub-bands, so that a requirement for communication service diversity is met.

Optionally, the configuration information further includes at least one of a location, bandwidth, the physical layer basic parameter, a frequency range, a frequency center point, a load status, a type identifier of a supported service, or a priority of the second sub-band.

Optionally, the physical layer basic parameter includes at least one of subcarrier bandwidth, a transmission time interval (TTI), a symbol length, a symbol quantity, or a cyclic prefix (CP) length.

Optionally, the transceiver unit 401 is further configured to receive configuration information of a third sub-band from the first sub-band. When the second sub-band is an uplink sub-band, the third sub-band is a downlink sub-band. When the second sub-band is a downlink sub-band, the third sub-band is an uplink sub-band.

Optionally, the transceiver unit 401 is further configured to receive information about an uplink sub-band corresponding to the first sub-band from the first sub-band. The uplink sub-band corresponding to the first sub-band is matched with a TTI of the first sub-band.

Optionally, the transceiver unit 401 is further configured to: when the second sub-band is a downlink sub-band, receive information about an uplink sub-band corresponding to the second sub-band from the first sub-band, where the uplink sub-band corresponding to the second sub-band is matched with a TTI of the second sub-band; or when the second sub-band is an uplink sub-band, receive information about a downlink sub-band corresponding to the second sub-band from the first sub-band, where the downlink sub-band corresponding to the second sub-band is matched with a TTI of the second sub-band.

Optionally, the transceiver unit 401 is further configured to: after sub-band reconfiguration, receive configuration information of each reconfigured sub-band from the first sub-band.

Optionally, the transceiver unit 401 is further configured to: after the sub-band reconfiguration, when the user equipment is transmitting a service by using the second sub-band, receive configuration information of each reconfigured sub-band from the second sub-band to which the user equipment is connected, where the second sub-band to which the user equipment is connected is a downlink sub-band; and after the sub-band reconfiguration, when the user equipment is in an idle state, receive the configuration information of each reconfigured sub-band from the first sub-band.

Optionally, the processing unit 402 is further configured to: when identifying that a status value of the sub-band reconfiguration flag bit is in a sub-band reconfiguration preparation state, stop accessing the second sub-band.

For the embodiment or any optional embodiment of the foregoing user equipment, refer to related descriptions in FIG. 1 to FIG. 7 for understanding. Details are not described herein.

In the foregoing multiple embodiments, the transceiver unit may be an input/output device such as a network adapter, and the processing unit may be a processor.

In the multiple embodiments of the foregoing network device or user equipment, it should be noted that, in an implementation, the transceiver unit may be implemented by the input/output I/O device (such as a network adapter), and the processing unit may be implemented by the processor by executing a program or an instruction in a memory (that is, the processing unit is implemented through mutual cooperation between the processor and a special instruction in a memory coupled with the processor). In another implementation, the transceiver unit may be implemented by the input/output I/O device (such as a network adapter), and the processing unit may be separately implemented by using a dedicated circuit. For a specific implementation, refer to the prior art. Details are not described herein. In still another implementation, the transceiver unit may be implemented by the input/output I/O device (such as a network adapter), and the processing unit may be implemented by using a field programmable gate array (FPGA). For a specific implementation, refer to the prior art. Details are not described herein. The present application includes but is not limited to the foregoing implementations. It should be understood that all solutions implemented according to the idea of the present application shall fall within the protection scope of the embodiments of the present application.

Figure 10:
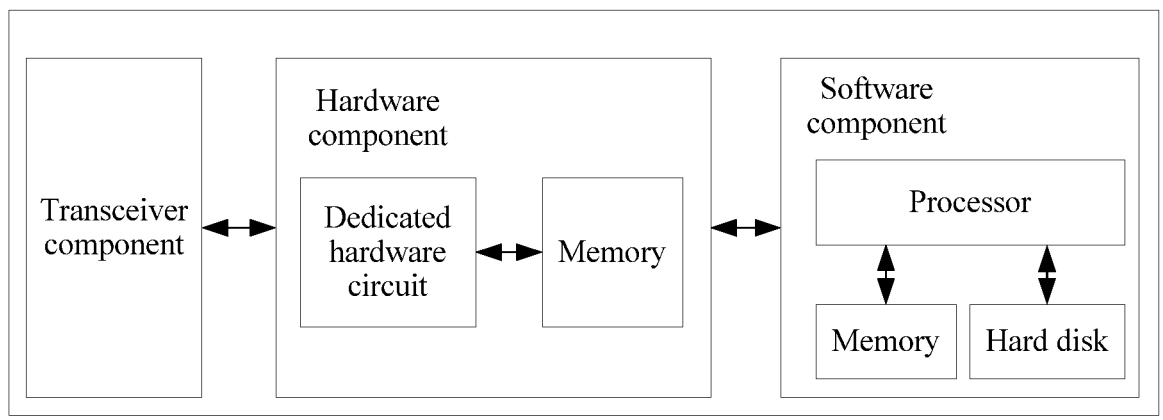
FIG. 10 is a schematic diagram of an embodiment of a network device/user equipment according to an embodiment of the present application.

An embodiment provides a hardware structure of a network device or user equipment. Referring to FIG. 10, the hardware structure of the network device or the user equipment may include three parts: a transceiver component, a software component, and a hardware component.

The transceiver component is a hardware circuit that is configured to receive or transmit a packet.

The hardware component may also be referred to as a "hardware processing module", or be simply referred to as "hardware" for short. The hardware component mainly includes a hardware circuit that implements some specific functions on the basis of dedicated hardware circuits (probably cooperating with another accessory component such as a memory) such as an FPGA and an ASIC. Usually, a processing speed of the hardware component is much higher than that of a general-purpose processor. However, it is extremely hard to change a function of the hardware component once the function is customized. Therefore, it is not flexible to implement the hardware component, and the hardware component is generally configured to process some fixed functions. It should be noted that, in actual application, the hardware component may also include processors such as an MCU (a microprocessor, such as a single-chip microcomputer) and a CPU. However, a main function of these processors is not to process big data but to perform some control. In this application scenario, a system in which these components cooperate with each other is a hardware component.

The software component (or simply referred to as "software") mainly includes a general-purpose processor (such as a CPU) and some accessory components (such as storage devices like a memory and a hard disk) of the general-purpose processor. Programming may be used to enable the processor to have a corresponding processing function, and when being implemented by using software, the software component may be flexibly configured according to a service, but a speed of the software component is usually slower than that of the hardware component. After data is processed by the software, the hardware component may send the processed data by using the transceiver component, or send the processed data to the transceiver component by using an interface connected to the transceiver component.

In this embodiment, the transceiver component is configured to send configuration information or receive configuration information.

Other functions of the hardware component and the software component are described in detail in the foregoing embodiments, and details are not described herein again.

The following provides, with reference to the accompanying drawings, detailed descriptions of a technical solution in which transceiving may be implemented by an input/output I/O device (such as a network adapter) and a processing unit may be implemented by a processor by executing a program or an instruction in a memory.

Figure 11:
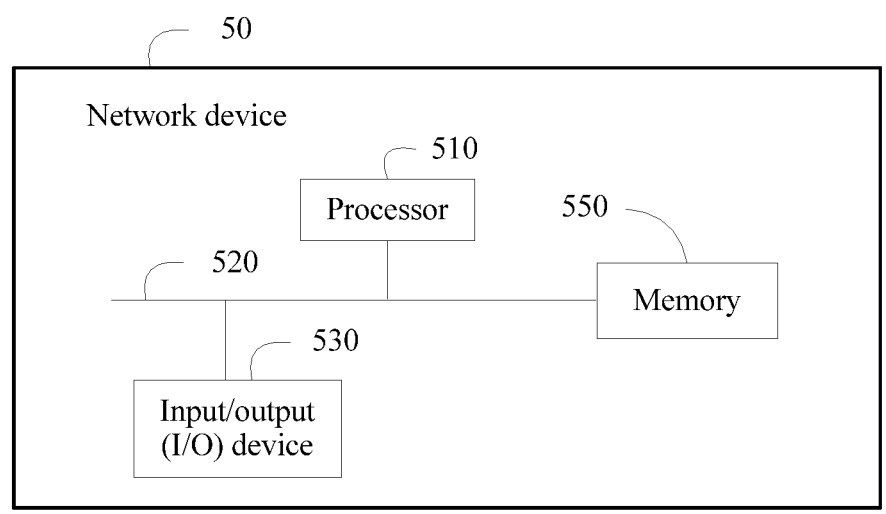
FIG. 11 is a schematic diagram of another embodiment of a network device according to an embodiment of the present application.

FIG. 11 is a schematic structural diagram of a network device 50 according to an embodiment of the present application. The network device 50 includes a processor 510, a memory 550, and an input/output I/O device 530. The memory 550 may include a read-only memory and a random access memory, and provide an operation instruction and data for the processor 510. A part of the memory 550 may further include a nonvolatile random access memory (NVRAM).

In some implementations, the memory 550 stores the following elements, executable modules or data structures, or subsets or extended sets of the executable modules or the data structures.

In this embodiment of the present application, the operation instruction stored in the memory 550 (the operation instruction may be stored in an operating system) is invoked, so as to: determine a first sub-band and a second sub-band; send, by using the I/O device 530, configuration information of the second sub-band to user equipment on the first sub-band, where the configuration information of the second sub-band includes identification information of the second sub-band, the identification information of the second sub-band is used by the user equipment to determine a physical layer basic parameter of the second sub-band, and a physical layer basic parameter of the first sub-band is different from the physical layer basic parameter of the second sub-band; and communicate with the user equipment by using the second sub-band.

In the current system, one carrier has only one type of waveform and one type of physical layer basic parameter, and consequently, a multi-service requirement cannot be met. By contrast, the network device provided in this embodiment of the present application may send configuration information of sub-bands with different physical layer basic parameters to the user equipment, and the network device and the user equipment may communicate with each other by using different sub-bands, so that a requirement for communication service diversity is met.

The processor 510 controls an operation of the network device 50, and the processor 510 may also be referred to as a CPU (central processing unit). The memory 550 may include a read-only memory and a random access memory, and provide an instruction and data for the processor 510. A part of the memory 550 may further include a nonvolatile random access memory (NVRAM). In specific application, the components of the network device 50 are coupled by using a bus system 520, and the bus system 520 may include a power bus, a control bus, a status signal bus, and the like in addition to a data bus. However, for clarity of descriptions, various buses are marked as the bus system 520 in the figure.

The methods disclosed in the foregoing embodiments of the present application may be applied to the processor 510, or may be implemented by the processor 510. The processor 510 may be an integrated circuit chip and have a signal processing capability. In an implementation process, the steps in the foregoing methods may be completed by using an integrated logic circuit of hardware in the processor 510 or an instruction in a form of software. The processor 510 may be a general-purpose processor, a digital signal processor (DSP), an application-specific integrated circuit (ASIC), a field programmable gate array (FPGA) or another programmable logic device, a discrete gate or a transistor logic device, or a discrete hardware component, and may implement or perform all methods, steps, and logical block diagrams disclosed in the embodiments of the present application. The general-purpose processor may be a microprocessor or the processor may be any conventional processor, or the like. The steps of the methods disclosed with reference to the embodiments of the present application may be directly performed and completed by a hardware decoding processor, or may be performed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 550. The processor 510 reads information in the memory 550, and completes the steps of the foregoing methods with reference to hardware of the processor 510.

Optionally, the configuration information further includes at least one of a location, bandwidth, the physical layer basic parameter, a frequency range, a frequency center point, a load status, a type identifier of a supported service, or a priority of the second sub-band.

Optionally, the physical layer basic parameter includes at least one of subcarrier bandwidth, a transmission time interval (TTI), a symbol length, a symbol quantity, or a cyclic prefix CP length.

Optionally, a downlink sub-band in the downlink carrier bandwidth is obtained by means of division according to a downlink service requirement, and an uplink sub-band in uplink carrier bandwidth is obtained by means of division according to an uplink service requirement. When the downlink service requirement is different from the uplink service requirement, division of the downlink sub-band is different from division of the uplink sub-band.

Optionally, the processor 510 is specifically configured to determine the first sub-band according to a service environment type, and determine the second sub-band according to a service type.

Optionally, the I/O device 530 is further configured to send configuration information of a third sub-band on the first sub-band.

When the second sub-band is an uplink sub-band, the third sub-band is a downlink sub-band. When the second sub-band is a downlink sub-band, the third sub-band is an uplink sub-band.

Optionally, the I/O device 530 is further configured to: send information about an uplink sub-band corresponding to the first sub-band on the first sub-band. The uplink sub-band corresponding to the first sub-band is matched with a TTI of the first sub-band.

Optionally, the I/O device 530 is further configured to: when the second sub-band is a downlink sub-band, send, by the network device, information about an uplink sub-band corresponding to the second sub-band on the first sub-band, where the uplink sub-band corresponding to the second sub-band is matched with a TTI of the second sub-band; or when the second sub-band is an uplink sub-band, send, by the network device, information about a downlink sub-band corresponding to the second sub-band on the first sub-band, where the downlink sub-band corresponding to the second sub-band is matched with a TTI of the second sub-band.

Optionally, the processor 510 is further configured to: if it is determined that a sub-band needs to be reconfigured, obtain configuration information of each reconfigured sub-band.

The I/O device 530 is configured to: send the configuration information of each reconfigured sub-band by using the first sub-band; or send the configuration information of each reconfigured sub-band to idle-state user equipment by using the first sub-band, and send, by using the second sub-band, the configuration information of each reconfigured sub-band to user equipment that transmits a service on the second sub-band.

Optionally, the processor 510 is further configured to: when the sub-band is periodically reconfigured, at a preset moment before the reconfiguration period starts, change, by the network device, a status value of a reconfiguration flag bit to a sub-band reconfiguration preparation state, and when the reconfiguration period starts, change, by the network device, the status value of the reconfiguration flag bit to a reconfiguration complete state.

Optionally, the reconfiguration period is an integer multiple of a radio frame, and is a fractional multiple of a system frame number period.

Figure 12:
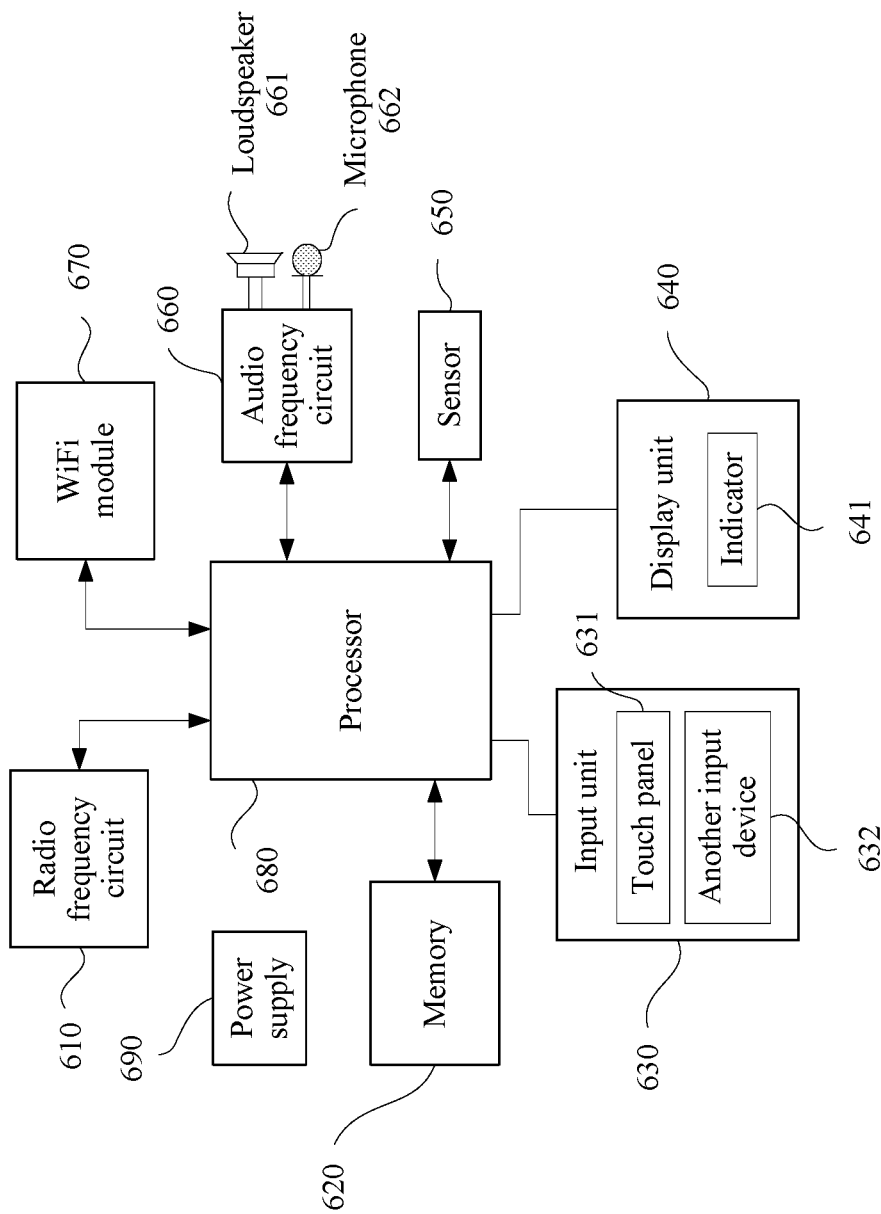
FIG. 12 is a schematic diagram of another embodiment of user equipment according to an embodiment of the present application.

FIG. 12 is a block diagram of a partial structure of user equipment 60 according to an embodiment of the present application. Referring to FIG. 12, the user equipment includes components such as a radio frequency circuit 610, a memory 620, an input unit 630, a display unit 640, a sensor 650, an audio frequency circuit 660, a WiFi module 670, a processor 680, and a power supply 690. A person killed in the art may understand that the structure of the user equipment shown in FIG. 12 does not constitute a limitation on the user equipment. Parts more or fewer than those shown in FIG. 12 may be included, some parts may be combined, or the parts may be arranged in different manners. The user equipment in this embodiment of the present application may be a terminal device such as a mobile phone.

Constituent parts of the user equipment are described in detail below with reference to FIG. 12.

The radio frequency circuit 610 may be configured to receive configuration information that is of a second sub-band and that is sent by a network device.

The memory 620 may be configured to store a software program and a module, and the processor 680 runs the software program and the module that are stored in the memory 620, to perform various functional applications of the user equipment and process data. The memory 620 may mainly include a program storage area and a data storage area. The program storage area may store an operating system, an application program that is required by at least one function (such as a sound playing function or an image playing function), and the like. The data storage area may store data (such as audio frequency data or a phone book) created according to use of the user equipment, and the like. In addition, the memory 620 may include a high-speed random access memory, and may further include a nonvolatile memory, such as at least one magnetic disk storage component, a flash component, or another volatile solid-state storage component.

The input unit 630 may be configured to receive input numeral or character information, and generate key signal input related to user setting and function control that are of the user equipment 60. Specifically, the input unit 630 may include a touch panel 631 and another input device 632. The touch panel 631, also referred to as a touchscreen, can collect a touch operation (for example, an operation performed by a user on the touch panel 631 or near the touch panel 631 by using any proper object or accessory such as a finger or a stylus) performed by the user on or near the touch panel 631, and drive corresponding connected user equipment according to a preset program. Optionally, the touch panel 631 may include two parts: touch detection user equipment and a touch controller. The touch detection user equipment detects a touch position of the user, detects a signal brought by a touch operation, and transfers the signal to the touch controller. The touch controller receives touch information from the touch detection user equipment, converts the touch information into coordinates of a touch point, then sends the coordinates of the touch point to the processor 680, and can receive and execute a command sent by the processor 680. In addition, the touch panel 631 may be implemented by using multiple types, such as a resistive type, a capacitive type, an infrared ray type, and a surface acoustic wave type. In addition to the touch panel 631, the input unit 630 may include the another input device 632. Specifically, the another input device 632 may include but is not limited to one or more of a physical keyboard, a function key (such as a volume control key or an on/off key), a trackball, a mouse, a joystick, or the like.

The display unit 640 may be configured to display information input by the user or information provided for the user, and various menus of the user equipment. The display unit 640 may include an indicator 641. Optionally, the indicator 641 may be configured by using a liquid crystal display (LCD), an organic light-emitting diode (OLED), or the like. Further, the touch panel 631 may cover the indicator 641. When detecting a touch operation on or near the touch panel 631, the touch panel 631 transfers the touch operation to the processor 680 to determine a type of a touch event, and then the processor 680 provides corresponding visual output on the indicator 641 according to the type of the touch event. Although the touch panel 631 and the indicator 641 in FIG. 12 are used as two independent parts to implement input and output functions of the user equipment, in some embodiments, the touch panel 631 and the indicator 641 may be integrated to implement the input and output functions of the user equipment.

The user equipment 60 may further include at least one sensor 650.

The audio frequency circuit 660, a loudspeaker 661, and a microphone 662 can provide an audio interface between the user and the user equipment. The audio frequency circuit 660 may transmit, to the loudspeaker 661, an electrical signal converted from received audio frequency data, and the loudspeaker 661 converts the electrical signal into a sound signal for output. In addition, the microphone 662 converts a collected sound signal into an electrical signal, the audio frequency circuit 660 converts the electrical signal into audio frequency data upon receipt of the electrical signal, and outputs the audio frequency data to the processor 680 for processing. Then, the audio frequency data is sent to, for example, another user equipment by using the radio frequency circuit 610, or the audio frequency data is output to the memory 620 for further processing.

The processor 680 is a control center of the user equipment, and connects all parts of the entire user equipment by using various interfaces and cables. A software program and/or a module stored in the memory 620 are/is run or executed and data stored in the memory 620 is invoked, to perform various functions of the user equipment and process data, so that overall monitoring is performed on the user equipment. Optionally, the processor 680 may include one or more processing units. Preferably, an application processor and a modem processor may be integrated into the processor 680. The application processor mainly processes an operating system, a user interface, an application program, or the like, and the modem processor mainly processes radio communications. It may be understood that the modem processor may not be integrated into the processor 680.

This embodiment of the present application may further include the following.

The radio frequency circuit 610 is configured to receive the configuration information of the second sub-band from a first sub-band. The configuration information of the second sub-band includes identification information of the second sub-band.

The processor 680 is configured to determine a physical layer basic parameter of the second sub-band according to the identification information of the second sub-band, and communicate with the network device by using the second sub-band. A physical layer basic parameter of the first sub-band is different from the physical layer basic parameter of the second sub-band.

The user equipment 60 further includes the power supply 690 (such as a battery) that supplies power to each part. Preferably, the power supply may be logically connected to the processor 680 by using a power supply management system, so as to implement functions such as charging and discharging management and power consumption management by using the power supply management system.

Although it is not shown in the figure, the user equipment 60 may further include a camera, a Bluetooth module, and the like, and details are not described herein.

This embodiment of the present application may further include the following.

Optionally, the configuration information further includes at least one of a location, bandwidth, the physical layer basic parameter, a frequency range, a frequency center point, a load status, a type identifier of a supported service, or a priority of the second sub-band.

Optionally, the physical layer basic parameter includes at least one of subcarrier bandwidth, a transmission time interval (TTI), a symbol length, a symbol quantity, or a cyclic prefix (CP) length.

Optionally, the radio frequency circuit 610 is further configured to receive configuration information of a third sub-band from the first sub-band.

When the second sub-band is an uplink sub-band, the third sub-band is a downlink sub-band. When the second sub-band is a downlink sub-band, the third sub-band is an uplink sub-band.

Optionally, the radio frequency circuit 610 is further configured to receive information about an uplink sub-band corresponding to the first sub-band from the first sub-band. The uplink sub-band corresponding to the first sub-band is matched with a TTI of the first sub-band.

Optionally, the radio frequency circuit 610 is further configured to: when the second sub-band is a downlink sub-band, receive, by the user equipment, information about an uplink sub-band corresponding to the second sub-band from the first sub-band, where the uplink sub-band corresponding to the second sub-band is matched with a TTI of the second sub-band; or when the second sub-band is an uplink sub-band, receive, by the user equipment, information about a downlink sub-band corresponding to the second sub-band from the first sub-band, where the downlink sub-band corresponding to the second sub-band is matched with a TTI of the second sub-band.

Optionally, the radio frequency circuit 610 is further configured to: after sub-band reconfiguration, receive configuration information of each reconfigured sub-band from the first sub-band.

Optionally, the radio frequency circuit 610 is further configured to: after sub-band reconfiguration, when the user equipment is transmitting a service by using the second sub-band, receive configuration information of each reconfigured sub-band from the second sub-band to which the user equipment is connected, where the second sub-band to which the user equipment is connected is a downlink sub-band; and after the sub-band reconfiguration, when the user equipment is in an idle state, receive the configuration information of each reconfigured sub-band from the first sub-band.

Optionally, the processor 680 is further configured to: when identifying that a status value of the sub-band reconfiguration flag bit is in a sub-band reconfiguration preparation state, stop accessing the second sub-band.

Figure 13:
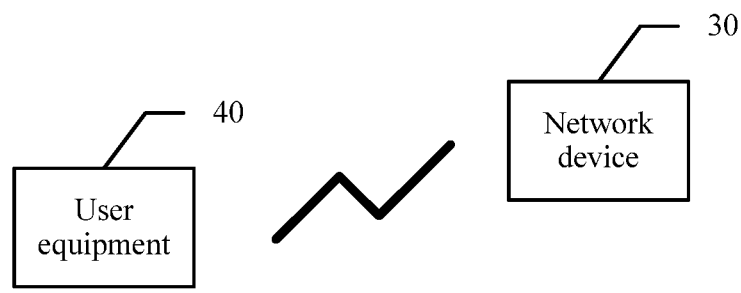
FIG. 13 is a schematic diagram of an embodiment of a wireless communications system according to an embodiment of the present application.

Referring to FIG. 13, an embodiment of a wireless communications system according to an embodiment of the present application includes a network device 30 and user equipment 40.

The network device 30 is configured to determine a first sub-band and a second sub-band, and send configuration information of the second sub-band to the user equipment on the first sub-band. The configuration information of the second sub-band includes identification information of the second sub-band, the identification information of the second sub-band is used by the user equipment to determine a physical layer basic parameter of the second sub-band, and a physical layer basic parameter of the first sub-band is different from the physical layer basic parameter of the second sub-band.

The user equipment 40 is configured to: receive the configuration information of the second sub-band from the first sub-band, where the configuration information of the second sub-band includes the identification information of the second sub-band; and determine the physical layer basic parameter of the second sub-band according to the identification information of the second sub-band, and communicate with the network device by using the second sub-band.

In the current system, one carrier has only one type of waveform and one type of physical layer basic parameter, and consequently, a multi-service requirement cannot be met. By contrast, according to the communications system provided in this embodiment of the present application, the network device may send configuration information of sub-bands with different physical layer basic parameters to the user equipment, and the network device and the user equipment may communicate with each other by using different sub-bands, so that a requirement for communication service diversity is met.

Optionally, all the multiple optional embodiments of FIG. 1 to FIG. 7 may be used as optional implementations of the wireless communications system in the present application, and details are not described herein.

A person of ordinary skill in the art may understand that all or a part of the steps of the methods in the embodiments may be implemented by a program instructing relevant hardware. The program may be stored in a computer readable storage medium. The storage medium may include: a ROM, a RAM, a magnetic disk, or an optical disc.

The communications method, device, and system provided in the embodiments of the present application are described above in detail. The principle and implementation of the present application are described herein by using specific examples. The descriptions about the embodiments of the present application are provided only to facilitate understanding of the method and core ideas of the present application. In addition, a person of ordinary skill in the art can make variations and modifications to the present application in terms of the specific implementations and application scopes according to the ideas of the present application. Therefore, content of this specification shall not be construed as a limit to the present application.

What is claimed is:

1. A method, comprising:
   determining, by a network device, a first sub-band corresponding to a first frequency range of a first carrier and a second sub-band corresponding to a second frequency range of the first carrier;
   sending, by the network device, configuration information of the second sub-band to a user equipment using a sub-carrier of the first sub-band, wherein the configuration information of the second sub-band comprises identification information of the second sub-band, the identification information of the second sub-band is used by the user equipment to determine a physical layer basic parameter of the second sub-band, a physical layer basic parameter of the first sub-band is different from the physical layer basic parameter of the second sub-band, and wherein the physical layer basic parameter of the first sub-band and the physical layer basic parameter of the second sub-band respectively comprise at least one of a sub-carrier bandwidth, a transmission time interval (TTI), a symbol length, a symbol quantity, or a cyclic prefix (CP) length;
   communicating, by the network device, with the user equipment using the second sub-band; and
   sending, by the network device on the first sub-band, information about an uplink sub-band corresponding to the first sub-band, wherein the correspondence indicates that response data to data received on the first sub-band is fed back by the user equipment on the uplink sub-band, and wherein a TTI of the uplink sub-band corresponding to the first sub-band is the same as the TTI of the first sub-band, or the TTI of the first sub-band is an integer multiple of the TTI of the uplink sub-band corresponding to the first sub-band.

2. The method according to claim 1, wherein the configuration information further comprises:
   a value of the physical layer basic parameter of the second sub-band, the second frequency range, a frequency center point of the second sub-band, a load status of the second sub-band, a type identifier of a supported service of the second sub-band, or a priority of the second sub-band.

3. The method according to claim 1, wherein the TTI of the uplink sub-band corresponding to the first sub-band is the same as the TTI of the first sub-band.

4. The method according to claim 1, further comprising:
   when the second sub-band is a downlink sub-band, sending, by the network device, information about an uplink sub-band corresponding to the second sub-band using the sub-carrier on the first sub-band, wherein the uplink sub-band corresponding to the second sub-band is matched with a TTI of the second sub-band; or
   when the second sub-band is an uplink sub-band, sending, by the network device, information about a downlink sub-band corresponding to the second sub-band using the sub-carrier on the first sub-band, wherein the downlink sub-band corresponding to the second sub-band is matched with the TTI of the second sub-band.

5. A method, comprising:
   receiving, by a user equipment, information that is transmitted using a sub-carrier of a first sub-band, wherein the information comprises configuration information of a second sub-band, and the configuration information of the second sub-band comprises identification information of the second sub-band, and wherein the first sub-band corresponds to a first frequency range of a first carrier and the second sub-band corresponds to a second frequency range of the first carrier;
   determining, by the user equipment, a physical layer basic parameter of the second sub-band according to the identification information of the second sub-band, wherein a physical layer basic parameter of the first sub-band is different from the physical layer basic parameter of the second sub-band, wherein the physical layer basic parameter of the first sub-band and the physical layer basic parameter of the second sub-band respectively comprise at least one of a sub-carrier bandwidth, a transmission time interval (TTI), a symbol length, a symbol quantity, or a cyclic prefix (CP) length;
   communicating, by the user equipment, with a network device using the second sub-band; and
   receiving, by the user equipment on the first sub-band, information about an uplink sub-band corresponding to the first sub-band, wherein the correspondence indicates that response data for data received on the first sub-band is fed back by the user equipment on the uplink sub-band, and wherein a TTI of the uplink sub-band corresponding to the first sub-band is the same as a TTI of the first sub-band, or the TTI of the first sub-band is an integer multiple of the TTI of the uplink sub-band corresponding to the first sub-band.

6. The method according to claim 5, wherein the configuration information further comprises:
   a value of the physical layer basic parameter of the second sub-band, the second frequency range corresponding to the second sub-band, a frequency center point of the second sub-band, a load status of the second sub-band, a type identifier of a supported service of the second sub-band, or a priority of the second sub-band.

7. The method according to claim 5, wherein the TTI of the uplink sub-band corresponding to the first sub-band is the same as the TTI of the first sub-band.

8. The method according to claim 5, further comprising:
   when the second sub-band is a downlink sub-band, receiving, by the user equipment, information about an uplink sub-band corresponding to the second sub-band from the first sub-band, wherein the uplink sub-band corresponding to the second sub-band is matched with a TTI of the second sub-band; and
   when the second sub-band is an uplink sub-band, receiving, by the user equipment, information about a downlink sub-band corresponding to the second sub-band from the first sub-band, wherein the downlink sub-band corresponding to the second sub-band is matched with a TTI of the second sub-band.

9. A network device, comprising:
   a processor;
   a non-transitory computer-readable storage medium storing a program to be executed by the processor, the program including instructions for:
      determining a first sub-band corresponding to a first frequency range of a first carrier and a second sub-band corresponding to a second frequency range of the first carrier; and
   a transceiver, configured to:
      send configuration information of the second sub-band to a user equipment using a sub-carrier of the first sub-band;
      communicate with the user equipment using the second sub-band, wherein the configuration information of the second sub-band comprises identification information of the second sub-band, the identification information of the second sub-band is used by the user equipment to determine a value of a physical layer basic parameter of the second sub-band, a physical layer basic parameter of the first sub-band is different from the physical layer basic parameter of the second sub-band, wherein the physical layer basic parameter of the first sub-band and the physical layer basic parameter of the second sub-band respectively comprise at least one of a sub-carrier bandwidth, a transmission time interval (TTI) a symbol length, a symbol quantity, or a cyclic prefix (CP) length; and sending, by the network device on the first sub-band, information about an uplink sub-band corresponding to the first sub-band, wherein the correspondence indicates that response data for data received on the first sub-band is fed back by the user equipment on the uplink sub-band, and wherein a TTI of the uplink sub-band corresponding to the first sub-band is same as a TTI of the first sub-band, or the TTI of the first sub-band is an integer multiple of the TTI of the uplink sub-band corresponding to the first sub-band.

10. The network device according to claim 9, wherein the configuration information further comprises a location of the second sub-band, a bandwidth of the second sub-band, the value of the physical layer basic parameter of the second sub-band, the second frequency range corresponding to the second sub-band, a frequency center point of the second sub-band, a load status of the second sub-band, a type identifier of a supported service of the second sub-band, or a priority of the second sub-band.

11. The network device according to claim 9, wherein the TTI of the uplink sub-band corresponding to the first sub-band is the TTI of the first sub-band.

12. The network device according to claim 9, wherein the transceiver is further configured to:

when the second sub-band is a downlink sub-band, send information about an uplink sub-band corresponding to the second sub-band using the sub-carrier of the first sub-band, wherein the uplink sub-band corresponding to the second sub-band is matched with a (TTI) of the second sub-band; or when the second sub-band is an uplink sub-band, send information about a downlink sub-band corresponding to the second sub-band using the sub-carrier of the first sub-band, wherein the downlink sub-band corresponding to the second sub-band is matched with a TTI of the second sub-band.

13. A user equipment, comprising:

a transceiver, configured to receive information that is transmitted using a sub-carrier of a first sub-band, wherein the information comprises configuration information of a second sub-band, wherein the configuration information of the second sub-band comprises identification information of the second sub-band, and wherein the first sub-band corresponds to a first frequency range of a first carrier and the second sub-band corresponds to a second frequency range of the first carrier;

a processor; and a non-transitory computer-readable storage medium storing a program to be executed by the processor, the program including instructions for:

determining a physical layer basic parameter of the second sub-band according to the identification information of the second sub-band, wherein a physical layer basic parameter of the first sub-band is different from the physical layer basic parameter of the second sub-band, wherein the physical layer basic parameter of the first sub-band and the physical layer basic parameter of the second sub-band respectively comprises at least one of a sub-carrier bandwidth, a transmission time interval (TTI), a symbol length, a symbol quantity, or a cyclic prefix (CP) length; and wherein the transceiver is further configured to:

communicate with a network device by the second sub-band; and receive, on the first sub-band, information about an uplink sub-band corresponding to the first sub-band, wherein the correspondence indicates that response data for data received on the first sub-band is fed back by the user equipment on the uplink sub-band, and wherein a TTI of the uplink sub-band corresponding to the first sub-band is same as a TTI of the first sub-band, or the TTI of the first sub-band is an integer multiple of the TTI of the uplink sub-band corresponding to the first sub-band.

14. The user equipment according to claim 13, wherein the configuration information further comprises a location of the second sub-band, bandwidth of the second sub-band, a value of the physical layer basic parameter of the second sub-band, the second frequency range corresponding to the second sub-band, a frequency center point of the second sub-band, a load status of the second sub-band, a type identifier of a supported service of the second sub-band, or a priority of the second sub-band.

15. The user equipment according to claim 13, wherein the TTI of the uplink sub-band corresponding to the first sub-band is the same as the TTI of the first sub-band.

16. The user equipment according to claim 13, wherein the transceiver is further configured to:

when the second sub-band is a downlink sub-band, receive information about an uplink sub-band corresponding to the second sub-band from the sub-carrier of the first sub-band, wherein the uplink sub-band corresponding to the second sub-band is matched with a TTI of the second sub-band; or when the second sub-band is an uplink sub-band, receive information about a downlink sub-band corresponding to the second sub-band from the sub-carrier of the first sub-band, wherein the downlink sub-band corresponding to the second sub-band is matched with a TTI of the second sub-band.

* * * * *